US012578785B2

(12) United States Patent
Fukumoto et al.

(10) Patent No.: US 12,578,785 B2
(45) Date of Patent: Mar. 17, 2026

(54) INFORMATION PROCESSING APPARATUS, METHOD FOR PROCESSING INFORMATION, AND PROGRAM

(71) Applicant: Sony Group Corporation, Tokyo (JP)

(72) Inventors: Yasutaka Fukumoto, Tokyo (JP);
Masayuki Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/932,619

(22) Filed: Oct. 31, 2024

(65) Prior Publication Data

US 2025/0053228 A1      Feb. 13, 2025

Related U.S. Application Data

(62) Division of application No. 17/291,790, filed as application No. PCT/JP2019/043841 on Nov. 8, 2019, now abandoned.

(51) Int. Cl.
*A63F 13/211*      (2014.01)
*A63F 13/212*      (2014.01)
(Continued)

(52) U.S. Cl.
CPC ............ *G06F 3/011* (2013.01); *A63F 13/211* (2014.09); *A63F 13/212* (2014.09); *A63F 13/213* (2014.09); *G02B 27/0101* (2013.01); *G09G 3/001* (2013.01); *A63F 13/812* (2014.09); *A63F 2300/1012* (2013.01); *A63F 2300/105* (2013.01);
(Continued)

(58) Field of Classification Search
CPC ........ G06F 3/011; G06F 3/012; G06F 3/0304; G06F 3/0346; G06F 3/038; G06F 3/0481; A63F 13/211; A63F 13/212; A63F 13/213; A63F 13/812; A63F 2300/1012; A63F 2300/105; A63F 2300/1087; A63F 2300/8011; A63F 13/245; A63F 13/428;
(Continued)

(56) References Cited

U.S. PATENT DOCUMENTS

| | | | |
|---|---|---|---|
| 2007/0081695 A1 | 4/2007 | Foxlin et al. | |
| 2012/0147531 A1 | 6/2012 | Rabii | |

(Continued)

FOREIGN PATENT DOCUMENTS

| | | |
|---|---|---|
| JP | 2011-175439 A | 9/2011 |
| JP | 2011-259384 A | 12/2011 |

(Continued)

*Primary Examiner* — Temesghen Ghebretinsae
*Assistant Examiner* — K. Kiyabu
(74) *Attorney, Agent, or Firm* — Paratus Law Group, PLLC

(57)      ABSTRACT

There is provided an information processing apparatus including: an acquisition unit that obtains first sensor information, which is output by a first sensor and is to be used to calculate positional information of an operator, and second sensor information, which is output by a second sensor and is to be used to calculate the positional information of the operator; and a calculation unit that calculates the positional information of the operator using the second sensor information in a case where the positional information of the operator calculated using the first sensor information is included in a set range set in advance.

17 Claims, 23 Drawing Sheets

(51) Int. Cl.

| | |
|---|---|
| *A63F 13/213* | (2014.01) |
| *G02B 27/01* | (2006.01) |
| *G06F 3/01* | (2006.01) |
| *G09G 3/00* | (2006.01) |
| *A63F 13/812* | (2014.01) |
| *G06V 20/20* | (2022.01) |

(52) U.S. Cl.
CPC ................. *A63F 2300/1087* (2013.01); *A63F 2300/8011* (2013.01); *G02B 2027/014* (2013.01); *G06V 20/20* (2022.01); *G09G 2354/00* (2013.01)

(58) Field of Classification Search
CPC .......... G02B 27/0101; G02B 2027/014; G09G 3/001; G09G 2354/00; G06V 20/20
See application file for complete search history.

(56) References Cited

U.S. PATENT DOCUMENTS

| | | | |
|---|---|---|---|
| 2013/0201291 A1 | 8/2013 | Liu et al. | |
| 2015/0258431 A1 | 9/2015 | Stafford et al. | |
| 2017/0357332 A1 | 12/2017 | Balan et al. | |
| 2017/0371406 A1 | 12/2017 | Yang et al. | |
| 2018/0095529 A1 | 4/2018 | Tokubo | |
| 2018/0203034 A1 | 7/2018 | Yamashita et al. | |
| 2019/0141297 A1 | 5/2019 | Vaidya et al. | |

FOREIGN PATENT DOCUMENTS

| | | | | |
|---|---|---|---|---|
| JP | 2012-505476 A | 3/2012 | | |
| JP | 2015-046089 A | 3/2015 | | |
| JP | 2016-192014 A | 11/2016 | | |
| WO | WO-2017043181 A1 * | 3/2017 | ............ | G01B 11/00 |
| WO | WO 2017/213969 A1 | 12/2017 | | |

* cited by examiner

FIG. 2

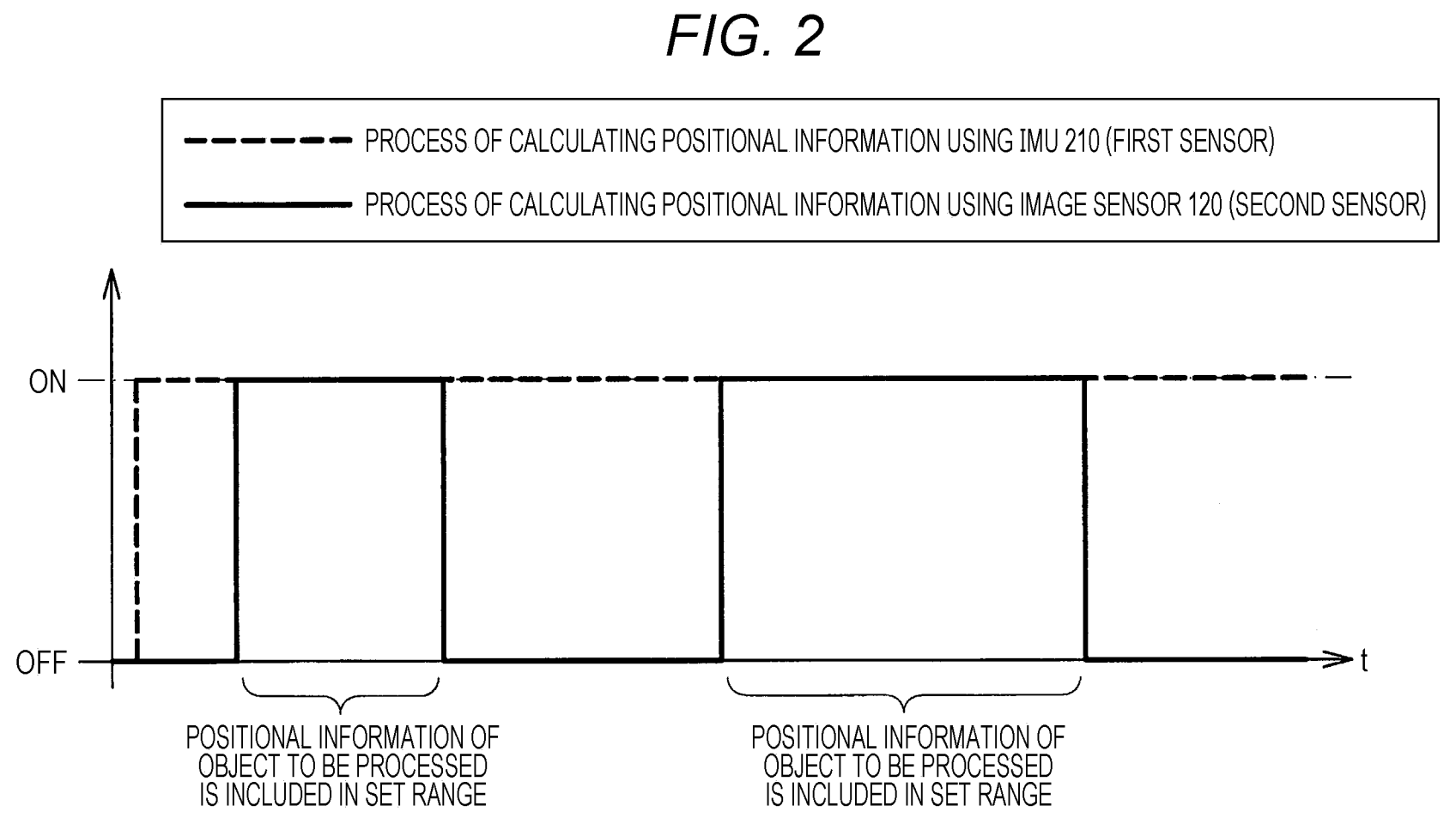

--- PROCESS OF CALCULATING POSITIONAL INFORMATION USING IMU 210 (FIRST SENSOR)

— PROCESS OF CALCULATING POSITIONAL INFORMATION USING IMAGE SENSOR 120 (SECOND SENSOR)

ON

OFF t

POSITIONAL INFORMATION OF OBJECT TO BE PROCESSED IS INCLUDED IN SET RANGE

POSITIONAL INFORMATION OF OBJECT TO BE PROCESSED IS INCLUDED IN SET RANGE

Figure 16:
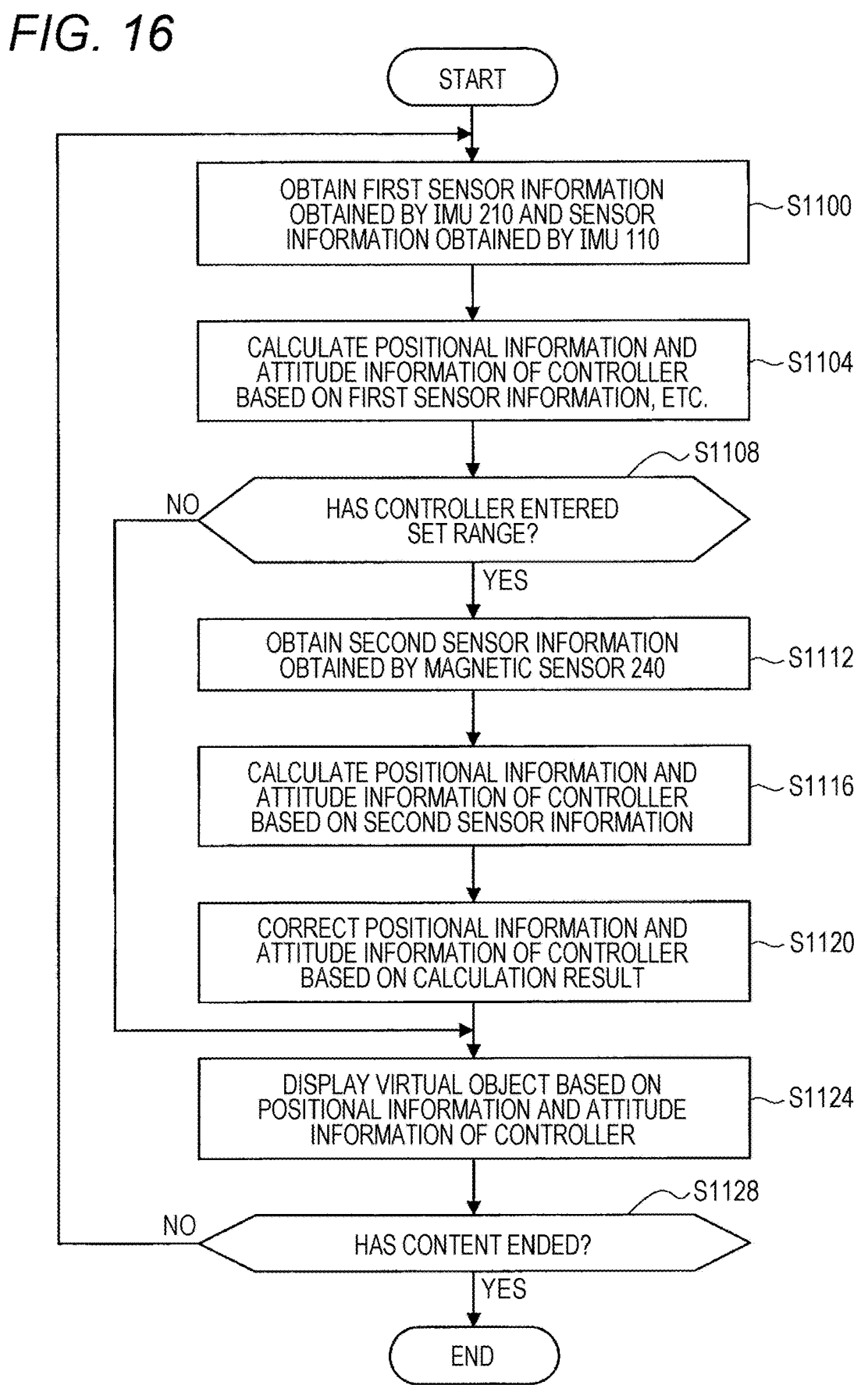

START

OBTAIN FIRST SENSOR INFORMATION
OBTAINED BY IMU 210 AND SENSOR
INFORMATION OBTAINED BY IMU 110 — S1100

CALCULATE POSITIONAL INFORMATION AND
ATTITUDE INFORMATION OF CONTROLLER
BASED ON FIRST SENSOR INFORMATION, ETC. — S1104

HAS CONTROLLER ENTERED
SET RANGE? — S1108

NO

YES

OBTAIN SECOND SENSOR INFORMATION
OBTAINED BY MAGNETIC SENSOR 240 — S1112

CALCULATE POSITIONAL INFORMATION AND
ATTITUDE INFORMATION OF CONTROLLER
BASED ON SECOND SENSOR INFORMATION — S1116

CORRECT POSITIONAL INFORMATION AND
ATTITUDE INFORMATION OF CONTROLLER
BASED ON CALCULATION RESULT — S1120

DISPLAY VIRTUAL OBJECT BASED ON
POSITIONAL INFORMATION AND ATTITUDE
INFORMATION OF CONTROLLER — S1124

HAS CONTENT ENDED? — S1128

NO

YES

END

*FIG. 17*

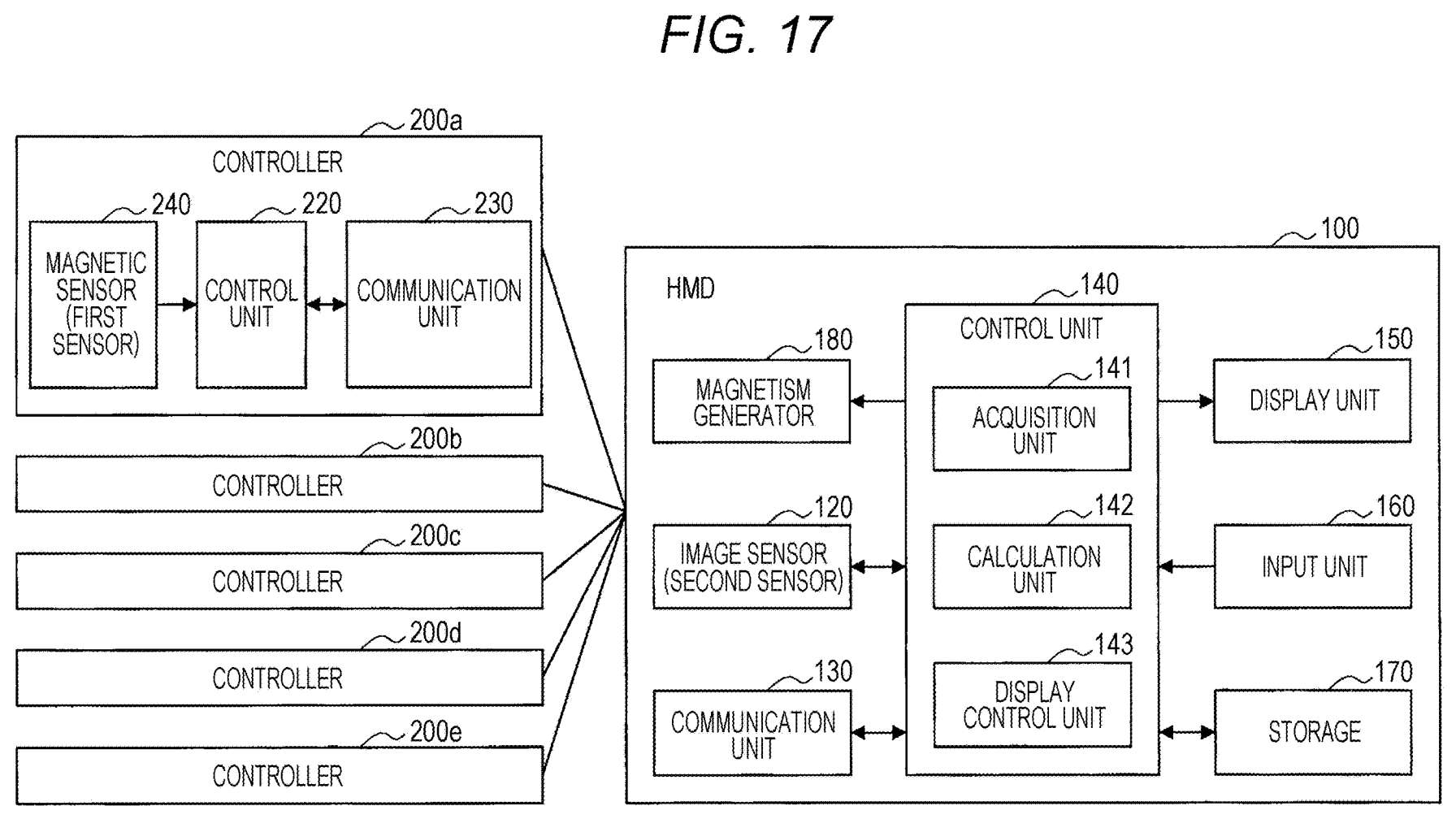

HMD — 100

CONTROL UNIT — 140

ACQUISITION UNIT — 141

CALCULATION UNIT — 142

DISPLAY CONTROL UNIT — 143

DISPLAY UNIT — 150

INPUT UNIT — 160

STORAGE — 170

MAGNETISM GENERATOR — 180

IMAGE SENSOR (SECOND SENSOR) — 120

COMMUNICATION UNIT — 130

CONTROLLER — 200a

COMMUNICATION UNIT — 230

CONTROL UNIT — 220

MAGNETIC SENSOR (FIRST SENSOR) — 240

CONTROLLER — 200b

CONTROLLER — 200c

CONTROLLER — 200d

CONTROLLER — 200e

*FIG. 24*

POSITIONAL ERROR

TIME

INFORMATION PROCESSING APPARATUS, METHOD FOR PROCESSING INFORMATION, AND PROGRAM

CROSS REFERENCE TO PRIOR APPLICATION

This application is a continuation of U.S. patent application Ser. No. 17/291,790 (filed on May 6, 2021), which is a National Stage patent application of PCT International Patent Application No. PCT/JP2019/043841 (filed on Nov. 8, 2019) under 35 U.S.C. § 371, which claims priority to Japanese Patent Application No. 2018-221420 (filed on Nov. 27, 2018), which are all hereby incorporated by reference in their entirety.

TECHNICAL FIELD

The present disclosure relates to an information processing apparatus, a method for processing information, and a program.

BACKGROUND ART

In recent years, a technique for calculating positional information of an operator using various sensors has been actively developed. For example, Patent Document 1 set out below discloses a technique that analyzes a captured image output by a camera attached to a user's head to calculate positional information of an operator (user's hand, etc.), and superimposes and displays a virtual object on the operator on the basis of the calculated positional information.

CITATION LIST

Patent Document

Patent Document 1: Japanese Patent Application Laid-Open No. 2011-175439

SUMMARY OF THE INVENTION

Problems to be Solved by the Invention

However, according to the technique disclosed in Patent Document 1 and the like, there has been a case where positional information of an operator cannot be appropriately calculated. For example, in the technique disclosed in Patent Document 1, an image processing apparatus analyzes a captured image output by the camera attached to the user's head, thereby calculating the positional information of the operator (user's hand, etc.) reflected in the captured image. However, the imaging process by the camera and the image recognition process by the image processing apparatus tend to consume relatively large power, whereby power consumption of the entire system increases when those processes are executed constantly.

Accordingly, the present disclosure has been conceived in view of the circumstances described above, and provides a novel and improved information processing apparatus, a method for processing information, and a program capable of achieving calculation of positional information of an operator more appropriately.

Solutions to Problems

According to the present disclosure, there is provided an information processing apparatus including: an acquisition unit that obtains first sensor information, which is output by a first sensor and is to be used to calculate positional information of an operator, and second sensor information, which is output by a second sensor and is to be used to calculate the positional information of the operator; and a calculation unit that calculates the positional information of the operator using the second sensor information in a case where the positional information of the operator calculated using the first sensor information is included in a set range set in advance.

Furthermore, according to the present disclosure, there is provided a method for processing information to be executed by a computer, the method including: obtaining first sensor information, which is output by a first sensor and is to be used to calculate positional information of an operator, and second sensor information, which is output by a second sensor and is to be used to calculate the positional information of the operator; and calculating the positional information of the operator using the second sensor information in a case where the positional information of the operator calculated using the first sensor information is included in a set range set in advance.

Furthermore, according to the present disclosure, there is provided a program for causing a computer to perform: obtaining first sensor information, which is output by a first sensor and is to be used to calculate positional information of an operator, and second sensor information, which is output by a second sensor and is to be used to calculate the positional information of the operator; and calculating the positional information of the operator using the second sensor information in a case where the positional information of the operator calculated using the first sensor information is included in a set range set in advance.

BRIEF DESCRIPTION OF DRAWINGS

FIG. 2 is a diagram for explaining an intermittent operation using an image sensor according to the first embodiment.

FIG. 4 is another diagram for explaining a specific example of the intermittent operation using an image sensor according to the first embodiment.

FIG. 7 is a block diagram illustrating an exemplary configuration of each device according to the first 5 embodiment.

FIG. 15 is a block diagram illustrating an exemplary configuration of each device according to the second embodiment.

FIG. 16 is a flowchart illustrating an exemplary process of providing a content to a user by an HMD and a controller according to the second embodiment.

FIG. 17 is a block diagram illustrating an exemplary configuration of each device according to a third embodiment.

FIG. 24 is a schematic diagram illustrating a time variation image of a positional error that may be generated in the position estimating processes according to the same embodiment.

FIG. 25 is a block diagram illustrating an exemplary hardware configuration of an information processing apparatus that embodies the HMD or the controller in each embodiment.

MODE FOR CARRYING OUT THE INVENTION

Hereinafter, preferred embodiments of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Note that descriptions will be given in the following order.
1. First Embodiment
2. Second Embodiment
3. Third Embodiment
4. Specific example of positional information calculation method
5. Exemplary hardware configuration
6. Summary 1. First Embodiment 1.1. Overview First, a first embodiment according to the present disclosure will be described.

Figure 1:
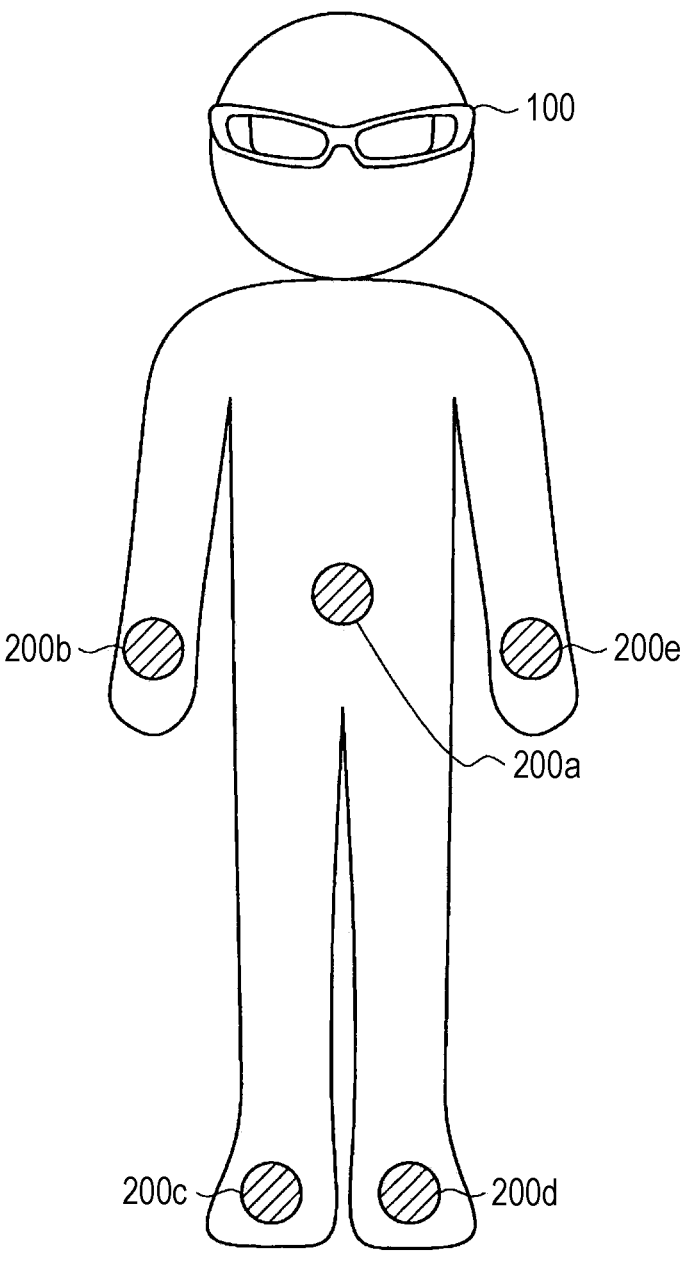
FIG. 1 is a diagram illustrating an exemplary configuration of an information processing system according to a first embodiment.

FIG. 1 is a diagram illustrating an exemplary configuration of an information processing system according to the first embodiment. As illustrated in FIG. 1, the information processing system according to the first embodiment includes a head-mounted display 100 (hereinafter referred to as "HMD 100") and a plurality of controllers 200 (controllers 200*a* to 200*e* in the example of FIG. 1). Note that, in the following descriptions, the controllers 200*a* to 200*e* may be simply referred to as a controller 200 in a case where it is not particularly necessary to distinguish them.

(1.1.1. Overview of Controller 200)

The controller 200 is an information processing apparatus to be worn on a part of a user's body. In addition, the controller 200 includes a first sensor that outputs first sensor information to be used for calculating positional information of an operator (i.e., the first sensor is attached to a part of the user's body). Here, the "operator" is an attachment portion of the controller 200 (e.g., a wrist portion to which the controller 200 is attached; hereinafter also simply referred to as "attachment portion") or a portion other than the attachment portion (e.g., an elbow portion to which no controller 200 is attached; hereinafter also simply referred to as "non-attachment portion") on the user's body. Hereinafter, an exemplary case where the operator is an attachment portion of the controller 200 on the user's body (hereinafter also simply referred to as "controller 200") will be described.

In addition, the "first sensor" indicates an inertial sensor (hereinafter referred to as "inertial measurement unit (IMU)") or the like including an acceleration sensor, a gyroscope sensor (angular velocity sensor), and the like, and the "first sensor information" includes acceleration, an angular velocity, and the like. The controller 200 provides the HMD 100 with the first sensor information output by the IMU.

The controller 200 is preferably attached to a reference joint part of the body (e.g., waist, head, etc.) or near the end part of the body (e.g., wrist, ankle, head, etc.). In the example illustrated in FIG. 1, the controller 200*a* is attached to the waist of the user, the controllers 200*b* and 200*e* are attached to the wrists, and the controllers 200*c* and 200*d* are attached to the ankles. Note that the number of the controllers 200 and the positions of the attachment portion are not limited to the example illustrated in FIG. 1.

(1.1.2. Overview of HMD 100)

The HMD 100 is an information processing apparatus that provides various contents to the user by being attached to the user's head. For example, the HMD 100 may be an optical transmission (optical see-through) device that allows the user to directly view the outside. In this case, the HMD 100 can provide various contents to the user by superimposing and displaying a virtual object on a real object that the user is directly viewing.

Note that a type of the HMD 100 is not particularly limited while an exemplary case where the HMD 100 is an optical transmission device will be described in the present embodiment. For example, the HMD 100 may be a non-transmissive device, or may be a video transmission (video see-through) device. Furthermore, the HMD 100 may perform what is called virtual reality (VR) display in which a virtual object is displayed to show the virtual world to the user, in addition to performing what is called augmented reality (AR) display in which a virtual object is superimposed on a real object and is displayed (note that it is not limited to the AR display and the VR display). Furthermore, the present disclosure may not be embodied as the HMD 100. For example, the present disclosure may be embodied as various devices, such as a smartphone, a tablet personal computer (PC), a portable game machine, or a digital camera. Furthermore, the "virtual object" indicates a concept including some kind of visually appealing image, such as a still image and a dynamic image.

In addition, the HMD 100 calculates positional information and attitude information of the controller 200 (operator) on the basis of the first sensor information output by the IMU (first sensor) of the controller 200. More specifically, the HMD 100 includes an IMU in a similar manner to the controller 200, and obtains sensor information output by the IMU. Then, the HMD 100 calculates positional information and attitude information of each attachment portion of the HMD 100 and the controller 200 on the basis of the first sensor information output by the IMU (first sensor) of the controller 200 and the sensor information output by the IMU of its own device. For example, the HMD 100 calculates positional information and attitude information by inertial navigation, and corrects a drift error generated at that time by a regression model, thereby calculating highly accurate positional information and attitude information of each attachment portion of the HMD 100 and the controller 200. The method will be detailed later.

Moreover, the HMD 100 calculates skeleton information including positional information and attitude information of each part in a skeleton structure on the basis of the positional information and the attitude information of each attachment portion. The skeleton structure includes information associated with body parts and bones that are line segments connecting the parts. Note that the parts in the skeleton structure correspond to end parts and joint parts of the body, for example. Furthermore, while the bones in the skeleton structure may correspond to human bones, for example, the position and the number of the bones are not necessarily in conformity with an actual human skeletal frame. By calculating the skeleton information, the HMD 100 can also calculate positional information and attitude information of non-attachment portions of the controller 200 in addition to those of attachment portions. Accordingly, as described above, not only the attachment portion of the controller 200 on the user's body but also the non-attachment portion can serve as an operator. Note that the method of calculating the positional information and the attitude information of the attachment portion and the non-attachment portion using the HMD 100 is not limited to the method described above (method using the inertial navigation and the regression model).

While the HMD 100 displays a virtual object to be superimposed on the real world on the basis of the positional information and the attitude information of the controller 200 (operator), it is difficult to accurately superimpose the virtual object when only the process based on the sensor information output by the IMU is carried out as the accuracy of the process is insufficient. In view of the above, the HMD 100 includes, in addition to the IMU, a second sensor that outputs second sensor information to be used for calculating positional information of the controller 200 (operator). Here, the "second sensor" according to the first embodiment is an image sensor (i.e., the HMD 100 includes a camera using an image sensor), and the "second sensor information" indicates a captured image output by the image sensor. Note that the second sensor information is not limited to a visualized captured image, and may be electric signals output by photoelectric conversion or the like. Here, the camera is assumed to be included in the HMD 100 in such a manner that the angle of view corresponds to the user's field of view (i.e., the camera is oriented in substantially the same direction as the user's line-of-sight; note that it is not necessarily limited thereto).

In addition, the HMD 100 can calculate positional information and attitude information of the controller 200 (operator) on the basis of the captured image (second sensor information) output by the image sensor. For example, the HMD 100 extracts a characteristic amount of a subject of the captured image by analyzing the captured image (second sensor information), and compares it with the characteristic amount of the controller 200 (operator) obtained in advance to calculate a degree of similarity, thereby detecting the controller 200 (operator) reflected in the captured image. Then, the HMD 100 calculates the positional information and the attitude information on the basis of a size and a form (including a shape, a pattern, etc.) of the controller 200 (operator) reflected in the captured image.

In this manner, the HMD 100 can calculate the positional information and the attitude information of the controller 200 (operator) using the first sensor information output by the IMU (first sensor) and the captured image (second sensor information) output by the image sensor (second sensor). Here, compared to the process of calculating the positional information and the attitude information of the operator using the first sensor information, the process of calculating the positional information and the attitude information of the operator using the captured image (second sensor information) consumes a larger amount of power although higher accuracy can be achieved.

In view of the above, the HMD 100 intermittently uses the image sensor (second sensor) at the time of calculating the positional information and the attitude information of the controller 200 (operator). To explain more specifically with reference to FIG. 2, the HMD 100 continues to calculate positional information and attitude information of the controller 200 (operator) on the basis of the first sensor information output by the IMU (first sensor) all the time (note that it is not limited to all the time) while providing a content to the user (in FIG. 2, calculating the positional information and the attitude information is expressed as "ON"). Then, in a case where the positional information of the controller 200 (operator) calculated using the first sensor information output by the IMU (first sensor) is included in a set range set in advance, the HMD 100 calculates positional information and attitude information of the controller 200 (operator) using the second sensor information output by the image sensor (second sensor). Here, FIG. 2 shows that the period during which the second sensor information is obtained by the positional information calculation process using the second sensor information output by the image sensor (second sensor) is shorter than the period during which the first sensor information is obtained by the positional information calculation process using the first sensor information output by the IMU (first sensor). It should be noted that the "period during which the first sensor information is obtained (period during which the second sensor information is obtained)" includes the total value of the period during which the first sensor information (second sensor information) is obtained from a certain time point to another time point (e.g., from the start time point to the end time point of the positional information calculation process). As described above, the HMD 100 can reduce the power consumption by intermittently using the image sensor (second sensor).

Here, the "set range" may be, for example, a range within the angle of view of the camera using the image sensor (second sensor). That is, in a case where the positional information of the controller 200 (operator) calculated using the first sensor information is included in the range (set range) within the angle of view of the camera, the HMD 100 analyzes the captured image (second sensor information)

output by the camera, thereby calculating positional information and attitude information of the controller 200 (operator) reflected in the captured image with higher accuracy. As described above, the camera is included in the HMD 100 in such a manner that its angle of view corresponds to the user's field of view (i.e., the set range corresponds to the user's field of view), whereby the HMD 100 can calculate the positional information and the attitude information of the controller 200 (operator) with higher accuracy in a case where the controller 200 (operator) has entered the user's field of view. Therefore, the HMD 100 can more accurately superimpose and display the virtual object on the real world on the basis of the calculated positional information and the attitude information.

Here, an exemplary case where the HMD 100 provides a content of a tennis game will be described. In the content, the HMD 100 displays a virtual object of a tennis racket according to a swing of the user's arm as if it is held in the user's hand, and displays a virtual object of a tennis ball as if it is hit by the tennis racket.

Figure 3:
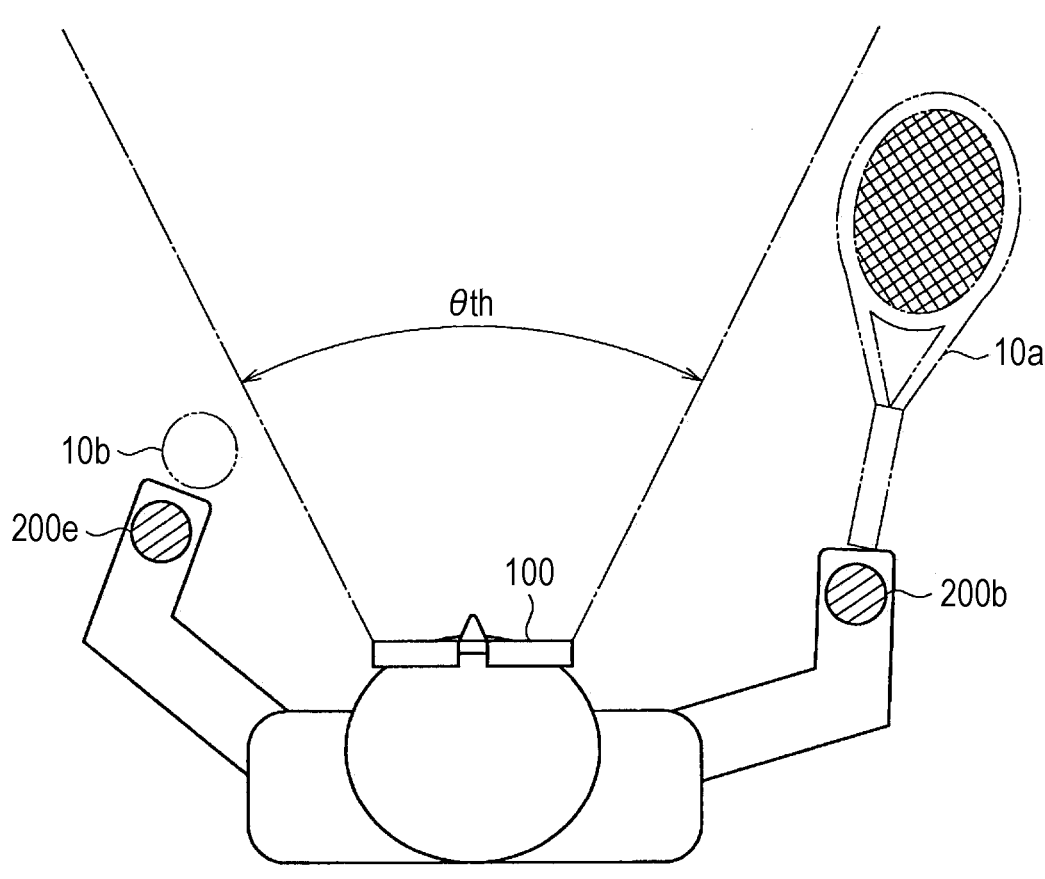
FIG. 3 is a diagram for explaining a specific example of the intermittent operation using an image sensor according to the first embodiment.

FIG. 3 is a view of the user playing a tennis game using the HMD 100 as viewed from above. FIG. 3 shows a state before the user hits the tennis ball with the tennis racket. The controller 200 (controllers 200b and 200e in the example of FIG. 3), which is an operator, is not included in a range within an angle of view θth of the camera, and the virtual object of the tennis racket (hereinafter referred to as "tennis racket 10a") and the virtual object of the tennis ball (hereinafter referred to as "tennis ball 10b") are not displayed.

Figure 4:
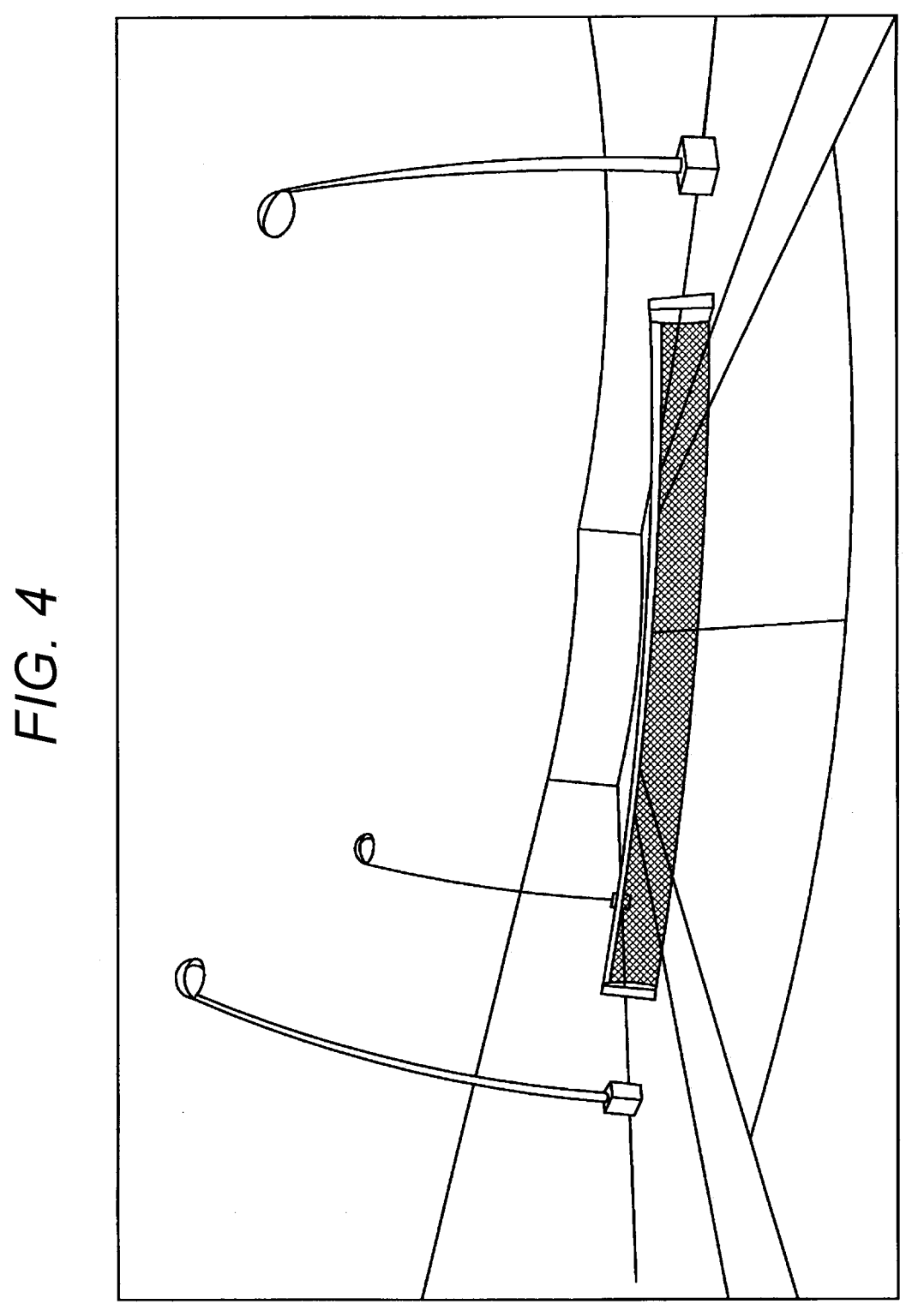

FIG. 4 is a view showing the user's field of view in the state before the user hits the tennis ball 10b with the tennis racket 10a (the state of FIG. 3). As illustrated in FIG. 4, the user is not seeing any of the controller 200 (operator), the tennis racket 10a, and the tennis ball 10b.

Figure 5:
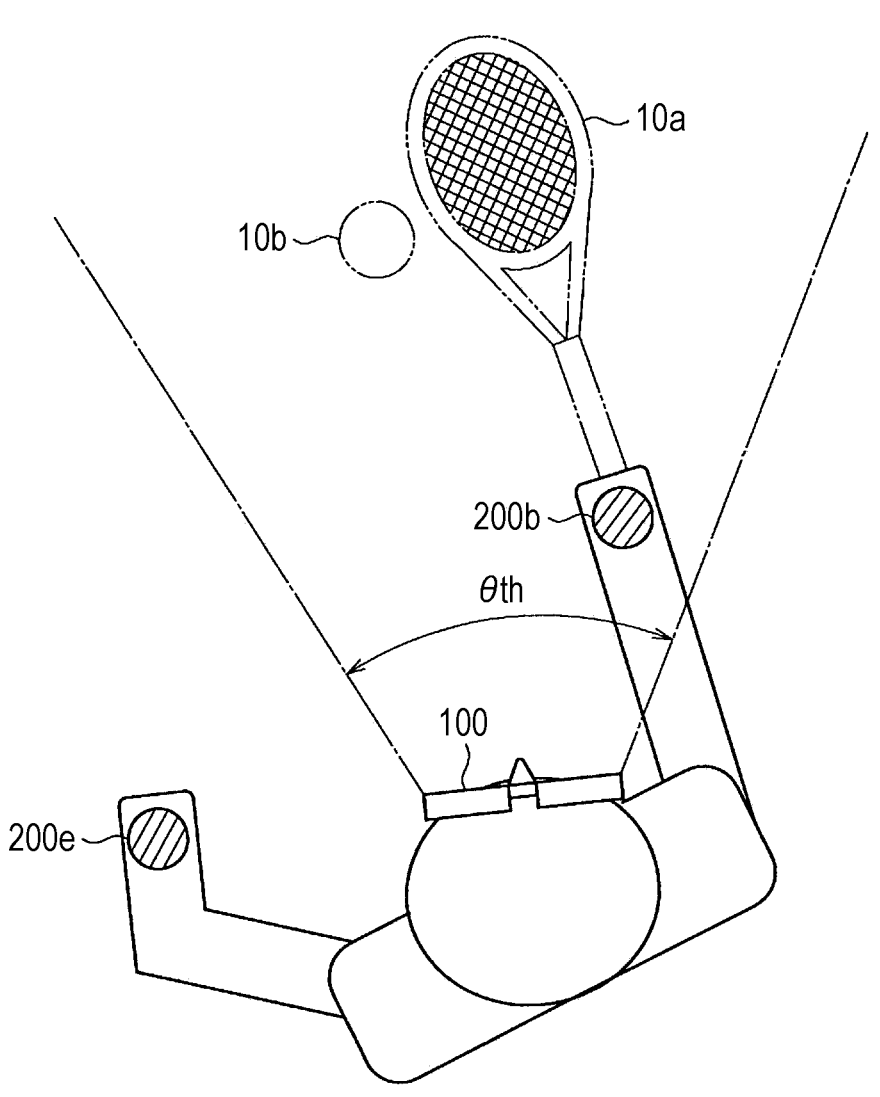
FIG. 5 is another diagram for explaining a specific example of the intermittent operation using an image sensor according to the first embodiment.

FIG. 5 shows a state after the user hits the tennis ball 10b with the tennis racket 10a. The controller 200b (operator) is included in the range within the angle of view θth of the camera, and the tennis racket 10a and the tennis ball 10b are superimposed on the real world and displayed.

Figure 6:
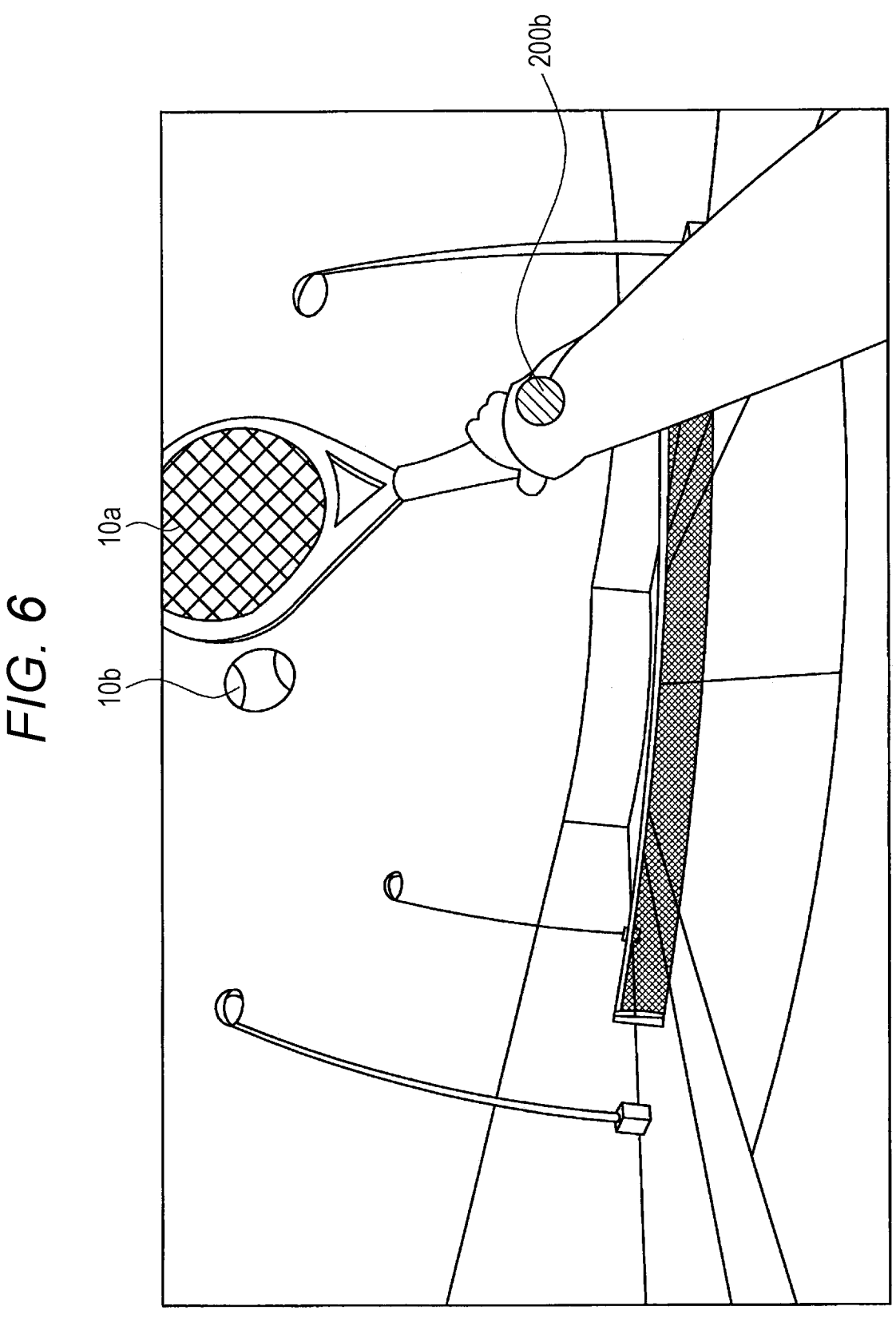
FIG. 6 is another diagram for explaining a specific example of the intermittent operation using an image sensor according to the first embodiment.

FIG. 6 is a view showing the user's field of view in the state after the user hits the tennis ball 10b with the tennis racket 10a (the state of FIG. 5). As illustrated in FIG. 6, the user is seeing the controller 200b (operator) attached to the wrist, and also seeing the tennis racket 10a and the tennis ball 10b, which are superimposed on the real world and displayed.

As described above, while the HMD 100 calculates the positional information and the attitude information using the IMU (first sensor) outside the set range, it can calculate the positional information and the attitude information with higher accuracy using the image sensor (second sensor) in an important range (set range) of the content. Furthermore, the HMD 100 can reduce the power consumption by intermittently using the image sensor (second sensor) in this manner.

Note that the set range used in the process is not necessarily a range within the angle of view θth of the camera. For example, the set range may be a range corresponding to a more important space in the content provided to the user.

1.2. Exemplary Configuration

The outline of the first embodiment according to the present disclosure has been described above. Next, an exemplary configuration of each device according to the first embodiment will be described with reference to FIG. 7. FIG.

7 is a block diagram illustrating an exemplary configuration of each device according to the first embodiment.
(1.2.1. Exemplary Configuration of Controller 200)

Figure 7:
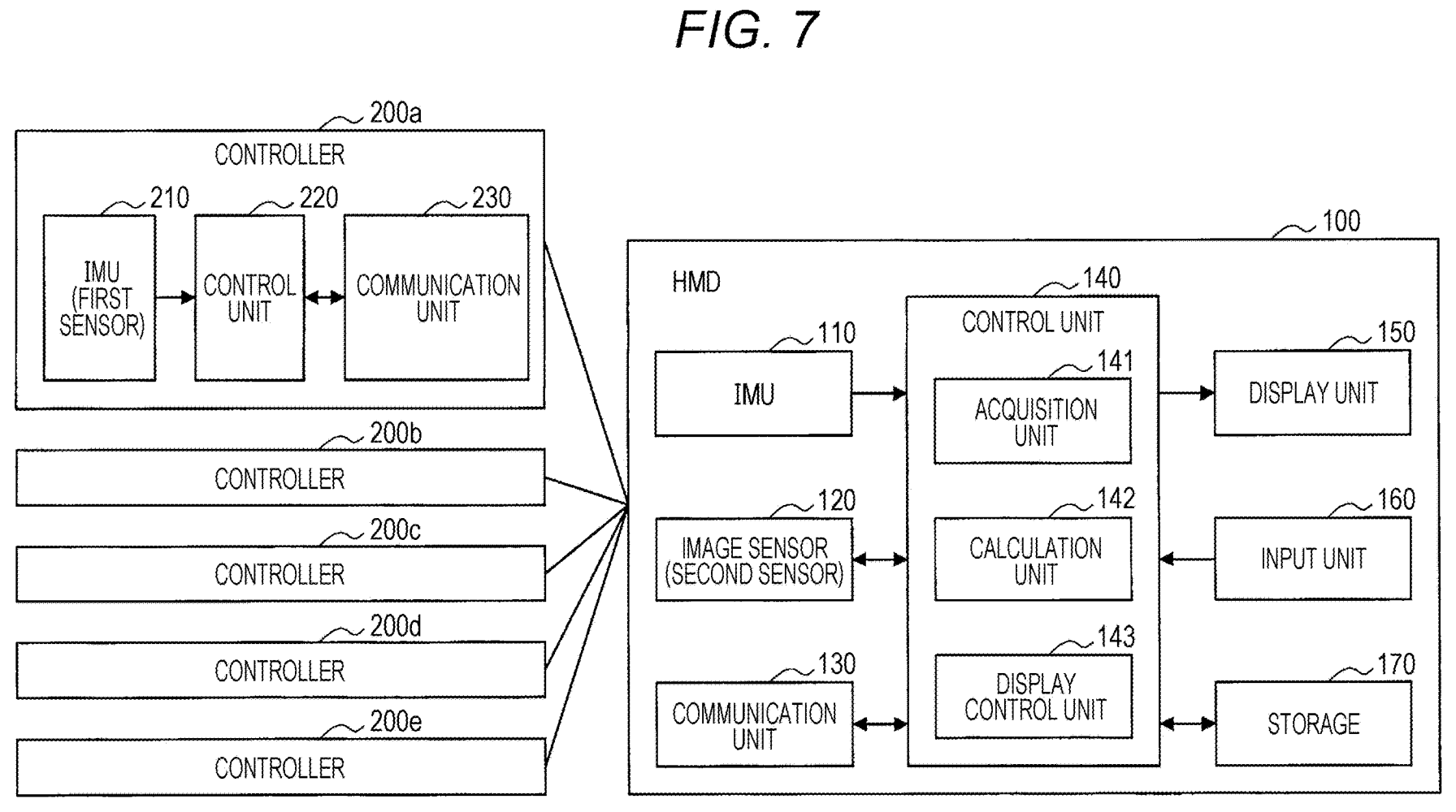

First, an exemplary configuration of the controller 200 will be described. As illustrated in FIG. 7, the controller 200 includes an IMU 210, a control unit 220, and a communication unit 230.

The IMU 210 has a configuration that functions as a first sensor. More specifically, the IMU 210 includes an acceleration sensor, a gyroscope sensor (angular velocity sensor), and the like. In addition, the acceleration sensor included in the IMU 210 outputs acceleration as first sensor information, and the acceleration output by the acceleration sensor may be acceleration of the controller 200 in the local coordinate system set for each controller 200. Furthermore, the gyroscope sensor included in the IMU 210 outputs an angular velocity as first sensor information, and the angular velocity output by the gyroscope sensor may be an angular velocity of the controller 200 in the local coordinate system. The frequency of the output of the first sensor information by the IMU 210 may be, for example, 800 [Hz] (it is needless to say that the frequency is not limited thereto).

Here, out of the first sensor and the second sensor according to the present disclosure, at least the first sensor is used as a pair with a predetermined instrument included in one device together with the second sensor. More specifically, the IMU 210 (first sensor) is used as a pair with an IMU 110 (predetermined instrument) included in the HMD 100 (one device) together with an image sensor 120 (second sensor). That is, the HMD 100 uses the IMU 210 (first sensor) of the controller 200 and the IMU 110 (predetermined instrument) of its own device as a pair, and analyzes the sensor information thereof, whereby the positional information and the attitude information of the controller 200 (operator) can be calculated. It should be noted that "using as a pair" includes "using the IMU 210 (first sensor) of one or more controllers 200 and the IMU 110 (predetermined instrument) together" (i.e., the number of the controllers 200 used for the process is not particularly limited).

The control unit 220 is configured to comprehensively control general processing performed by the controller 200. For example, the control unit 220 can control a start and a stop of each configuration. Furthermore, the control unit 220 controls communication performed by the communication unit 230, and causes the first sensor information (angular velocity and acceleration) obtained by the IMU 210 to be transmitted to the HMD 100. Alternatively, the control unit 220 may perform a part of the process performed by the HMD 100 on the first sensor information obtained by the IMU 210, and may cause a result of the process obtained by the process to be transmitted to the HMD 100. Note that the contents of the control performed by the control unit 220 are not limited thereto. For example, the control unit 220 may control processing (e.g., processing related to an operating system (OS), etc.) generally performed in various servers, general-purpose computers, PCs, tablet PCs, and the like.

The communication unit 230 is configured to exchange data with an external device (particularly HMD 100) by wire or wirelessly. The communication unit 230 wirelessly communicates with an external device directly or via a network access point using a scheme such as a wired local area network (LAN), a wireless LAN, Wireless Fidelity (Wi-Fi, registered trademark), infrared communication, Bluetooth (registered trademark), and short-range/non-contact communication, for example.

The exemplary configuration of the controller 200 has been described above. Note that the configuration described above with reference to FIG. 7 is merely an example, and the configuration of the controller 200 is not limited to such an example. For example, the controller 200 may include a configuration not illustrated in FIG. 7. Furthermore, the configuration illustrated in FIG. 7 may be provided in an external device (not illustrated), and the controller 200 may implement each function described above by communicating and cooperating with the external device. Furthermore, in a case where multiple controllers 200 are used, each of the controllers 200 may have a configuration different from one another (in the present embodiment, an exemplary case where each of the controllers 200 has the same configuration is described).

(1.2.2. Exemplary Configuration of HMD 100)

Next, an exemplary configuration of the HMD 100 will be described. As illustrated in FIG. 7, the HMD 100 includes the IMU 110, the image sensor 120, a communication unit 130, a control unit 140, a display unit 150, an input unit 160, and a storage 170. Furthermore, the control unit 140 includes an acquisition unit 141, a calculation unit 142, and a display control unit 143.

The IMU 110 has a configuration that includes, in a similar manner to the IMU 210 of the controller 200 described above, an acceleration sensor, a gyroscope sensor (angular velocity sensor), and the like. The acceleration sensor included in the IMU 110 outputs acceleration, and the acceleration output by the acceleration sensor may be acceleration of the HMD 100 in the local coordinate system set in the HMD 100. Furthermore, the gyroscope sensor included in the IMU 110 outputs an angular velocity, and the angular velocity output by the gyroscope sensor may be an angular velocity of the HMD 100 in the local coordinate system.

The image sensor 120 is a configuration that functions as a second sensor. More specifically, the image sensor 120 is a sensor included in a camera (not illustrated), has a plurality of pixels on an imaging surface, and each pixel converts a subject image having been subject to image formation by an imaging lens (not illustrated) into electric signals, thereby outputting a captured image (second sensor information). The image sensor 120 is, for example, a charge-coupled device (CCD) sensor array, a complementary metal-oxide semiconductor (CMOS) sensor array, or the like, and is not necessarily limited thereto. Furthermore, a frame rate of the image sensor 120 may be about 60 [fps], for example (it is needless to say that the frame rate is not limited thereto).

Here, as described with reference to FIG. 2, acquisition of the captured image (second sensor information) starts when the positional information calculated using the angular velocity and the like (first sensor information) has entered the set range, and the acquisition of the captured image (second sensor information) stops when the positional information calculated using the angular velocity and the like (first sensor information) has got out of the set range. In other words, in the process of calculating the positional information of the controller 200 (operator), the period during which the captured image (second sensor information) is obtained is shorter than the period during which the angular velocity and the like (first sensor information) is obtained by the IMU.

Furthermore, an acquisition frequency of the captured image (second sensor information) may be increased when the positional information calculated using the angular velocity and the like (first sensor information) has entered the set range, and an acquisition frequency of the captured image (second sensor information) may be decreased when the positional information calculated using the angular velocity and the like (first sensor information) has got out of the set range. For example, first, calculation of the positional information of the controller 200 (operator) using a high-rate angular velocity and the like (first sensor information), and detection of the controller 200 (operator) using a low-frame-rate captured image (second sensor information) (it should be noted that the detection is for determining whether or not the controller 200 exists within the set range, not for calculating the positional information of the controller 200) are carried out. Then, in a case where the positional information calculated using the angular velocity and the like (first sensor information) has entered the set range, the frame rate of the captured image (second sensor information) may be increased to calculate the positional information using the high-frame-rate captured image (second sensor information).

It should be noted that the "acquisition" and "acquisition frequency" (of the first sensor information and the second sensor information) described above may indicate the acquisition and acquisition frequency of various kinds of information (first sensor information and second sensor information) using various sensors (IMU 210 and image sensor 120), or may indicate the acquisition and acquisition frequency of various kinds of information (first sensor information and second sensor information) from various sensors using the acquisition unit 141 of the HMD 100.

The communication unit 130 is configured to exchange data with an external device (particularly controller 200) by wire or wirelessly. The communication unit 130 wirelessly communicates with an external device directly or via a network access point using a scheme such as a wired LAN, a wireless LAN, Wi-Fi, infrared communication, Bluetooth (registered trademark), and short-range/non-contact communication, for example.

The control unit 140 is configured to comprehensively control general processing performed by the HMD 100. For example, the control unit 140 can control a start and a stop of each configuration. Note that the contents of the control performed by the control unit 140 are not particularly limited. For example, the control unit 140 may control processing (e.g., processing related to an OS, etc.) generally performed in various servers, general-purpose computers, PCs, tablet PCs, and the like.

The acquisition unit 141 is configured to obtain various kinds of information. More specifically, the acquisition unit 141 obtains the first sensor information output by the IMU 210 (first sensor) of the controller 200, and the second sensor information output by the image sensor 120 (second sensor). Moreover, the acquisition unit 141 also obtains the sensor information output by the IMU 110 included in its own device. The acquisition unit 141 provides those pieces of obtained information to the calculation unit 142.

The calculation unit 142 is configured to calculate positional information and attitude information of the HMD 100 and the controller 200 (operator). More specifically, the calculation unit 142 calculates positional information and attitude information of each attachment portion of the HMD 100 and the controller 200 on the basis of the first sensor information output by the IMU 210 (first sensor) of the controller 200 and the sensor information output by the IMU 110. For example, the HMD 100 calculates the positional information by the inertial navigation, and corrects a drift error generated at that time by the regression model, thereby calculating highly accurate positional information and attitude information of each attachment portion of the HMD 100 and the controller 200 (operator) (the method will be detailed later).

Furthermore, the calculation unit 142 calculates skeleton information including positional information and attitude information of each part in a skeleton structure on the basis of the positional information and the attitude information of the HMD 100 and the controller 200 (operator). More specifically, the calculation unit 142 calculates the skeleton information using inverse kinematics (IK) calculation. The inverse kinematics calculation is a technique for calculating a displacement of each joint part from the positional information and the attitude information of the end part. In the inverse kinematics calculation, each part of the body is regarded as a simple link mechanism including a predetermined number of bones of known length (e.g., an arm is regarded as a link mechanism including two bones of known length), and flexibility of the link mechanism is set and the angle formed by each bone is calculated, thereby calculating the skeleton information.

Then, the calculation unit 142 intermittently uses the image sensor 120 (second sensor) on the basis of the positional information of the controller 200 (operator) included in the skeleton information. More specifically, the positional information (positional information calculated using the first sensor information) of the controller 200 (operator) included in the skeleton information is defined by the coordinate system of the positional information calculated using the captured image (second sensor information) obtained by the image sensor 120 (hereinafter, the coordinate system of the positional information calculated using the second sensor information may be referred to as a "global coordinate system"; i.e., the positional information calculated using the first sensor information and the positional information calculated using the second sensor information are defined by the global coordinate system). Accordingly, the calculation unit 142 can determine whether or not the positional information of the controller 200 (operator) included in the skeleton information is included in the set range set in advance. In addition, in a case where the positional information of the controller 200 (operator) included in the skeleton information is included in the set range, the calculation unit 142 calculates the positional information of the controller 200 (operator) using the second sensor information output by the image sensor 120.

Figure 8:
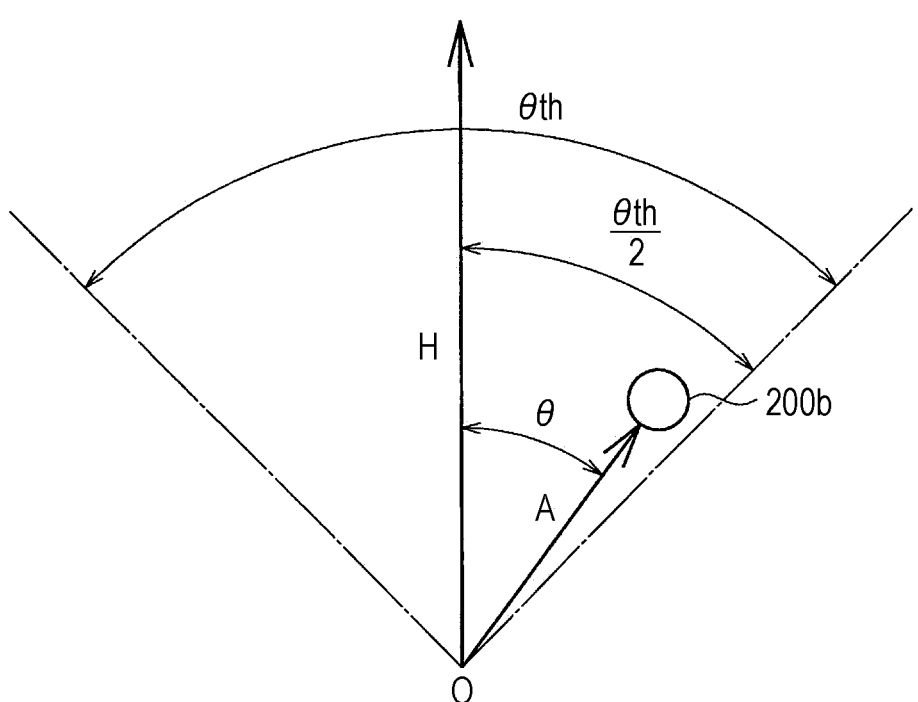
FIG. 8 is a diagram for explaining control by a calculation unit according to the first embodiment.

For example, as in the example described with reference to FIGS. 3 to 6, in a case where the controller 200 (operator) is included in the range (set range) within the angle of view of the camera, the calculation unit 142 calculates the positional information of the controller 200 (operator) using the captured image (second sensor information) of the camera. To explain more specifically with reference to FIG. 8, when a base point O of the angle of view of the camera is set as a starting point, an angle formed by a position vector A of the controller 200 (controller 200b attached to the right wrist in the example of FIG. 8) and a direction vector H of the camera is set to θ. Here, in a case where, when the angle of view (horizontal angle of view) of the camera is set to θth, a relationship of θ≤θth/2 is established, the calculation unit 142 determines that the controller 200b (operator) is included in the range of the angle of view of the camera, and performs a process of calculating positional information using the captured image (second sensor information) of the camera. On the other hand, in a case where a relationship of θ>θth/2 is established, the calculation unit 142 determines that the controller 200b (operator) is not included in the range of the angle of view of the camera, and continues the process of calculating positional information using the first sensor information obtained from the IMU 210. Note that, while the determination process based on the horizontal angle of view θth of the camera has been described with reference to FIG. 8, a similar determination process can be performed for the vertical angle of view of the camera.

To explain more specifically regarding the process of calculating the positional information and the attitude information using the captured image (second sensor information) of the camera, the calculation unit 142 analyzes the captured image (second sensor information) of the camera to extract a characteristic amount of the subject of the captured image, and compares the characteristic amount with the characteristic amount of the controller 200 (operator) obtained in advance to calculate the similarity therebetween, thereby detecting the controller 200 (operator) reflected in the captured image. Then, the calculation unit 142 calculates the positional information and the attitude information on the basis of a size and a form (including a shape, a pattern, etc.) of the controller 200 (operator) reflected in the captured image.

Thereafter, the calculation unit 142 corrects the positional information and the attitude information calculated using the sensor information obtained from the IMU (IMU 110 and IMU 210) using the positional information and the attitude information of the controller 200 (operator) calculated using the captured image (this correction process is equivalent to calculation of positional information of the operator using the first sensor information and the second sensor information). Note that the calculation unit 142 may use the positional information and the attitude information of the controller 200 (operator) calculated using the captured image as positional information and attitude information of the controller 200 (operator) without performing the correction.

Here, various measures may be taken to simplify the image processing at the time of calculating the positional information and the attitude information of the controller 200 (operator) using the captured image. For example, a marker coated with what is called a retroreflective material having a property of strongly reflecting infrared light (hereinafter referred to as "reflective marker") may be provided on the surface of the controller 200. With this arrangement, infrared light is emitted onto the reflective marker from the outside (e.g., HMD 100) and a captured image in which the reflected light is reflected is analyzed, whereby the calculation unit 142 can easily calculate the positional information and the attitude information of the controller 200 in the captured image. Note that, although a type of the retroreflective material is not particularly limited, it is preferable to employ a material having transparency in a visible light region. With a transparent or translucent retroreflective material adopted in a visible region, reflected light does not become obtrusive while the calculation of the positional information and the attitude information of the controller 200 is facilitated.

Furthermore, a self-luminous light source (e.g., light-emitting diode (LED), etc.) may be provided on the surface of the controller 200. With this arrangement, the calculation unit 142 can easily calculate the positional information and the attitude information of the controller 200 in the captured image by analyzing the captured image in which the light emitted from the light source is reflected. Note that a type of the light source is not particularly limited.

Furthermore, the HMD 100 (specifically, storage 170) may store information associated with a size and shape of the controller 200 in advance. With this arrangement, the calculation unit 142 can easily calculate the positional information and the attitude information of the controller 200 in the captured image by comparing the information associated with the size and shape stored in advance with the size and shape of the controller 200 reflected in the captured image.

Moreover, the calculation unit 142 calculates positional information and attitude information of the HMD 100 using the visual simultaneous localization and mapping (SLAM). The Visual SLAM is a technique that can simultaneously perform self-position/attitude calculation and map creation by analyzing a captured image of a camera under an unknown environment. Note that a method of implementing the Visual SLAM is not particularly limited, and the calculation unit 142 can calculate the positional information and the attitude information of the HMD 100 using a publicly known method of implementing the Visual SLAM. Furthermore, usage of the Visual SLAM in the calculation of the positional information and the attitude information of the HMD 100 is merely an example, and the method of calculating the positional information and the attitude information of the HMD 100 is not limited thereto.

The display control unit 143 is configured to control the display of the virtual object by the display unit 150 on the basis of the positional information and the attitude information of the controller 200 (operator) calculated by the calculation unit 142. For example, the display control unit 143 controls the display unit on the basis of the positional information and the attitude information of the controller 200 (operator) to superimpose and display the virtual object on the controller 200 (operator).

The display unit 150 is configured to display a virtual object in the user's field of view. More specifically, the display unit 150 displays the virtual object in a manner of being superimposed on the real world under the control of the display control unit 143. Note that the display method by the display unit 150 is not particularly limited, and may be flexibly changed depending on the type of the HMD 100 or the like.

The input unit 160 is configured to receive input made by the user. For example, the input unit 160 includes input devices such as a touch panel, buttons, switches, a microphone, a mouse, and a keyboard, and the user can input desired information by using those input devices. Note that the input devices included in the input unit 160 are not particularly limited.

The storage 170 is configured to store various kinds of information. For example, the storage 170 stores programs, parameters, and the like to be used by each configuration of the HMD 100. Furthermore, the storage 170 may store sensor information obtained by each sensor. Note that the contents of the information to be stored in the storage 170 are not limited thereto.

The exemplary configuration of the HMD 100 has been described above. Note that the configuration described above with reference to FIG. 7 is merely an example, and the configuration of the HMD 100 is not limited to such an example. For example, the HMD 100 may not include a part of the configuration illustrated in FIG. 7, and may include a configuration not illustrated in FIG. 7. Furthermore, the configuration illustrated in FIG. 7 may be provided in an external device (not illustrated), and the HMD 100 may implement each function described above by communicating and cooperating with the external device. For example, in a case where a hub device capable of communicating with one or more controllers 200 is separately provided and the hub device aggregates various kinds of information (e.g., first sensor information, etc.) from the controller 200, the HMD 100 may receive various kinds of information by communicating with the hub device instead of each controller 200. Furthermore, in a case where an external server is separately provided, the HMD 100 and the external server may execute various processes described above by distributed processing.

1.3. Exemplary Process Flow

Figure 9:
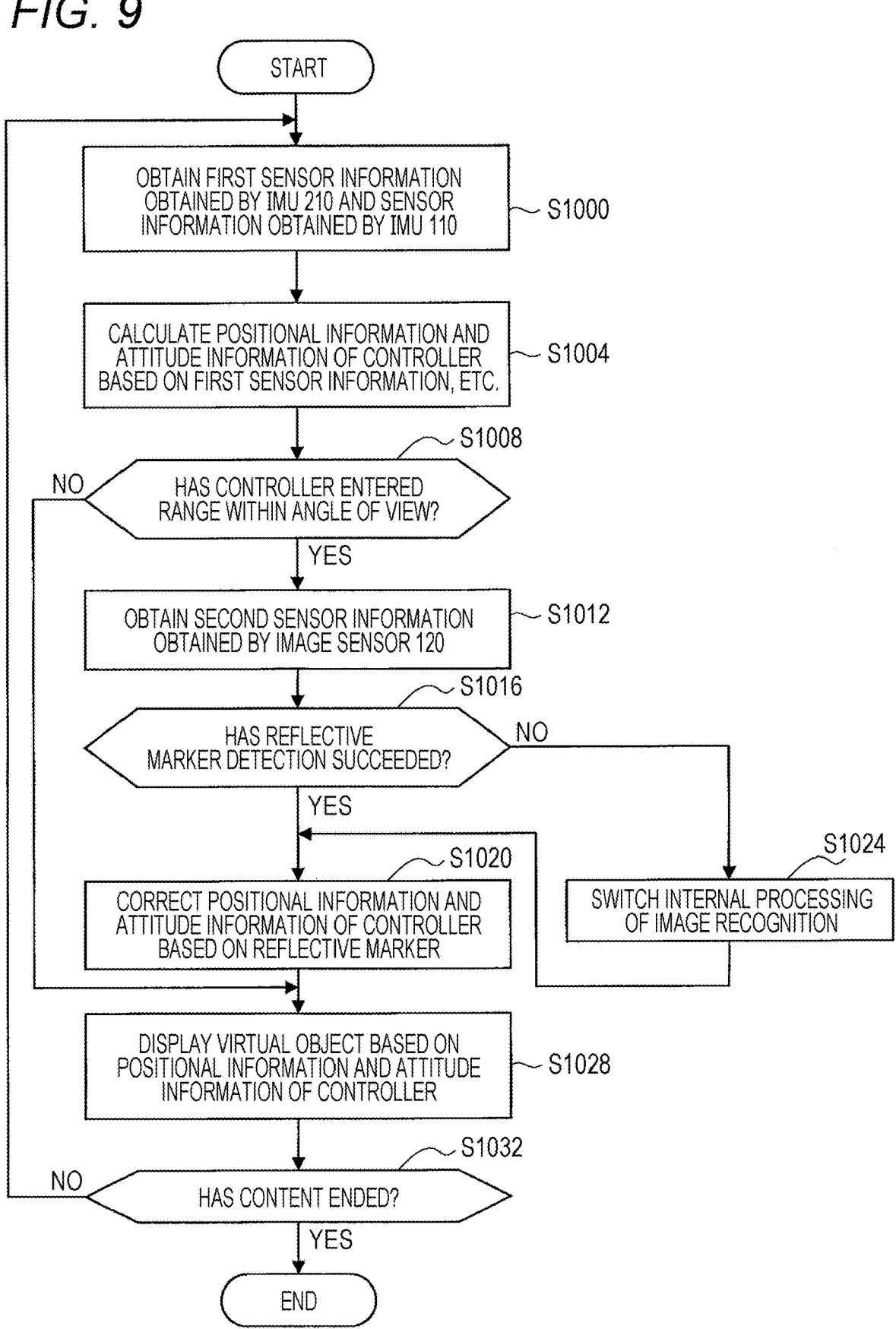
FIG. 9 is a flowchart illustrating an exemplary process of providing a content to a user by a head-mounted display (HMD) and a controller according to the first embodiment.

The foregoing has described the exemplary configuration of each device according to the first embodiment. Next, an exemplary process flow of each device according to the first embodiment will be described with reference to FIG. 9. FIG. 9 is a flowchart illustrating an exemplary process of providing a content to the user by the HMD 100 and the controller 200. Note that, in the flowchart, it is assumed that a reflective marker is provided on the surface of the controller 200 to simplify the image processing at the time of calculating the positional information and the attitude information of the controller 200 (operator).

In step S1000, the acquisition unit 141 of the HMD 100 obtains the first sensor information obtained by the IMU 210 of the controller 200 (operator) and the sensor information obtained by the IMU 110. In step S1004, the calculation unit 142 calculates the positional information and the attitude information of the controller 200 (operator) on the basis of the first sensor information from the IMU 210 and the sensor information from the IMU 110.

In step S1008, the calculation unit 142 determines whether or not the controller 200 (operator) has entered the range (set range) within the angle of view of the camera. In a case where the controller 200 (operator) is determined to have entered the range (set range) within the angle of view of the camera (Yes in step S1008), in step S1012, the acquisition unit 141 obtains the captured image (second sensor information) obtained by the image sensor 120.

In step S1016, the calculation unit 142 attempts to detect the reflective marker included in the controller 200 by analyzing the captured image (second sensor information). In a case where the reflective marker included in the controller 200 is detected (Yes in step S1016), in step S1020, the calculation unit 142 corrects the positional information and the attitude information of the controller 200 calculated using the first sensor information on the basis of the detected reflective marker (i.e., controller 200 including the reflective marker).

In a case where the reflective marker included in the controller 200 is not detected despite the fact that the controller 200 is determined to have entered the range (set range) within the angle of view of the camera (No in step S1016), in step S1024, it is determined that the imaging condition and the recognition performance are the cause of the failure in the reflective marker detection, and the calculation unit 142 attempts to detect the reflective marker by switching internal processing of the image recognition. For example, in a case where the imaging environment is too bright (e.g., in the illuminance is too high), the calculation unit 142 may increase the intensity of the infrared light to be emitted onto the reflective marker to facilitate the detection of the reflective marker. Furthermore, in a case where the moving speed of the controller 200 is too fast, the calculation unit 142 may increase the frame rate of the camera. Moreover, in a case where there is a plurality of algorithms to be used for analyzing the captured image, the calculation unit 142 may switch the algorithm to a higher-precision algorithm. Note that these are merely examples, and the contents of the process performed by the calculation unit 142 to facilitate the detection of the reflective marker are not particularly limited. In a case where the detection of the reflective marker has succeeded by switching the internal processing of the image recognition, the calculation unit 142 corrects the positional information and the attitude information of the controller 200 on the basis of the reflective marker in step S1020.

In step S1028, the display control unit 143 controls the display unit 150 on the basis of the positional information and the attitude information of the controller 200, thereby superimpose and display the virtual object on the real world. In step S1032, the control unit 220 determines whether or not the content has ended. In a case where it is determined that the content has ended (Yes in step S1032), the series of processing ends, and in a case where it is determined that the content has not ended (No in step S1032), the process of steps S1000 to S1028 continues.

1.4. Variations

The foregoing has described the exemplary process flow of each device according to the first embodiment. Next, variations of the first embodiment will be described.
(1.4.1. Variations of Set Range)

Figure 10:
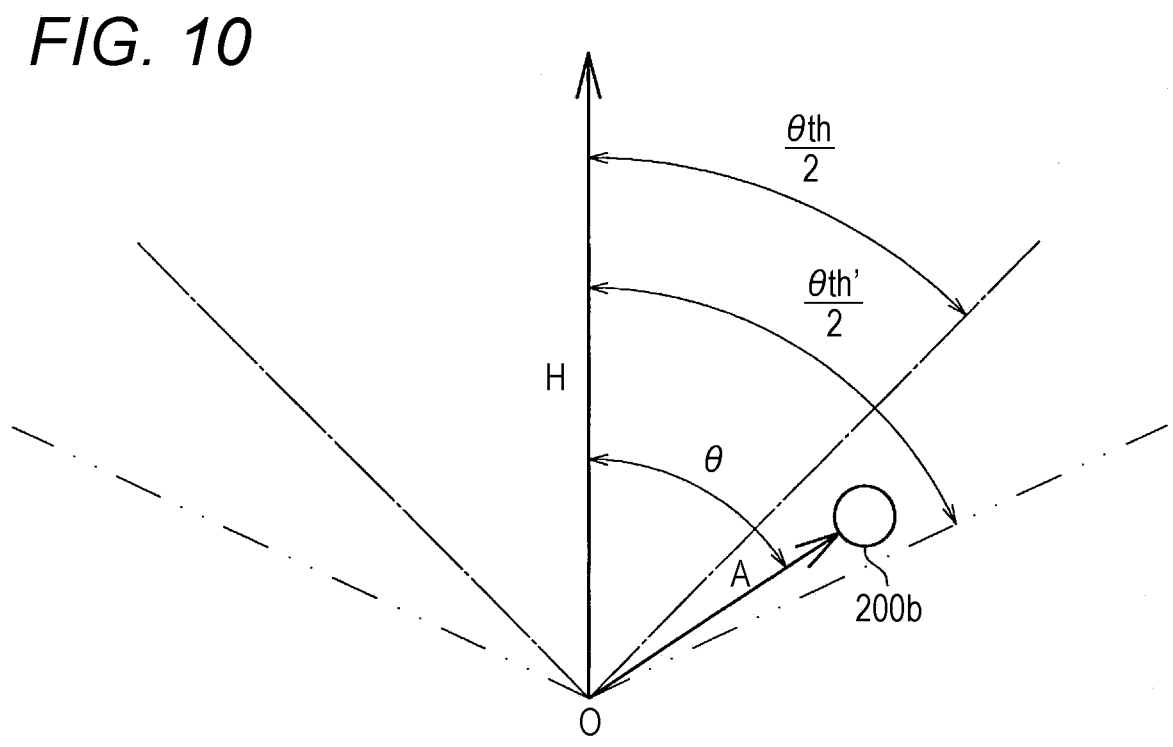
FIG. 10 is a diagram for explaining a variation of the first embodiment.

In the above descriptions, an exemplary case where the set range is a range within the angle of view of the camera has been described. Here, the set range may include a range outside the angle of view of the camera. For example, when the angle of view of the camera is set to $\theta$th and the angle obtained by adding a buffer to the angle of view $\theta$th is set to $\theta$th', the set range may be a range within the angle $\theta$th'. More specifically, as illustrated in FIG. 10, in a case where a relationship of $\theta \leq \theta$th'/2 is established ($\theta$ represents an angle formed by the position vector A of the controller 200 and the direction vector H of the camera), the calculation unit 142 determines that the controller 200b (operator) is included in the set range, and starts the process of calculating the positional information and the attitude information using the captured image (second sensor information) of the camera. In this manner, the buffer is provided, and the range within the angle $\theta$th', which is wider than the angle of view $\theta$th, is set as the set range so that the calculation unit 142 can start the image processing before the controller 200 enters the range within the angle of view $\theta$th, whereby the positional information and the attitude information of the controller 200 reflected in the captured image can be calculated earlier. This is especially useful in a case where the angle of view $\theta$th of the camera is narrower than the display angle of view of the HMD 100. Note that, while the determination process based on the horizontal angle $\theta$th' of the camera has been described with reference to FIG. 10, a similar determination process can be performed for the vertical angle of the camera.

Figure 11:
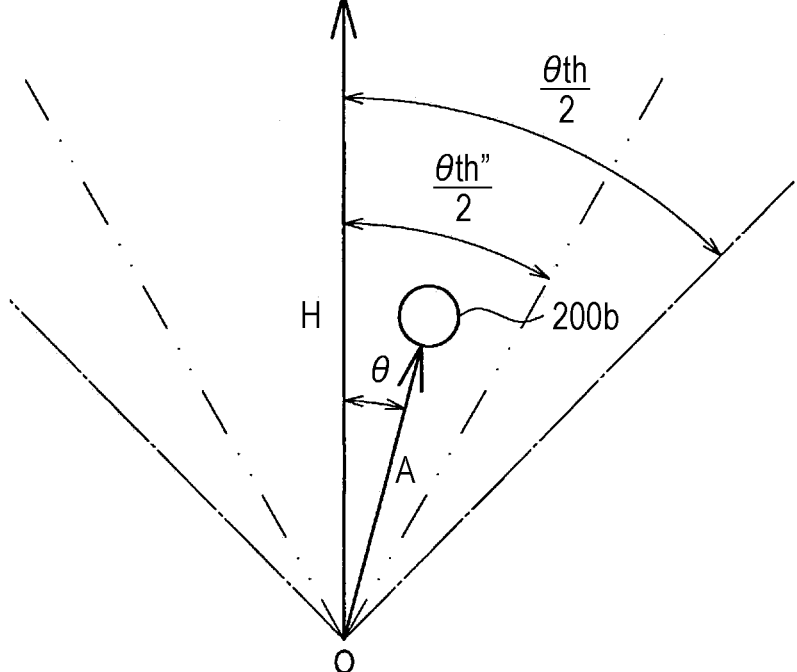
FIG. 11 is another diagram for explaining a variation of the first embodiment.

Furthermore, when an angle narrower than the angle of view $\theta$th of the camera is set to $\theta$th", the set range may be within the angle $\theta$th". More specifically, as illustrated in FIG. 11, in a case where a relationship of $\theta \leq \theta$th"/2 is established, the calculation unit 142 determines that the controller 200b (operator) is included in the set range, and starts the process of calculating the positional information and the attitude information using the captured image (second sensor information) of the camera. Note that, in this case as well, a similar determination process can be performed for the vertical angle of the camera.

Figure 12:
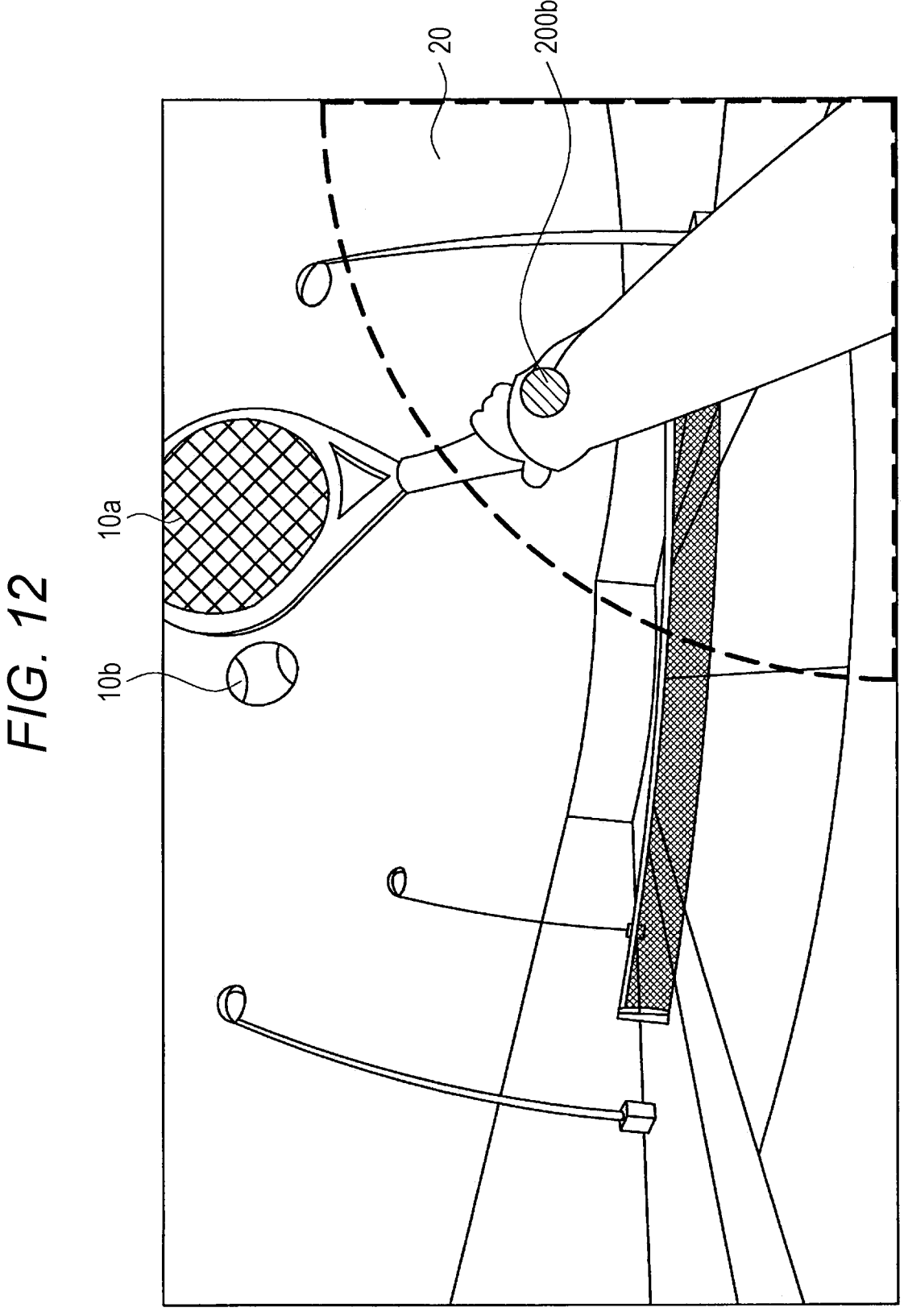
FIG. 12 is another diagram for explaining a variation of the first embodiment.

Furthermore, the set range may be an area having a predetermined shape in the captured image. For example, as illustrated in FIG. 12, the set range may be an area 20 having a predetermined shape and located in the lower right part of the captured image. While FIG. 12 illustrates an exemplary case where a content of a tennis game is provided, the lower right part of the captured image is an area where the controller 200b attached to the right wrist tends to be reflected in the content. In this manner, with the area where the controller 200 tends to be reflected being set as a set range, the HMD 100 can easily calculate the positional information and the attitude information of the controller 200. Furthermore, with the set range being limited in this manner, the power consumption of the HMD 100 is reduced. Note that the shape of the set range in the captured image is not particularly limited.
(1.4.2. Other Variations)

Figure 13:
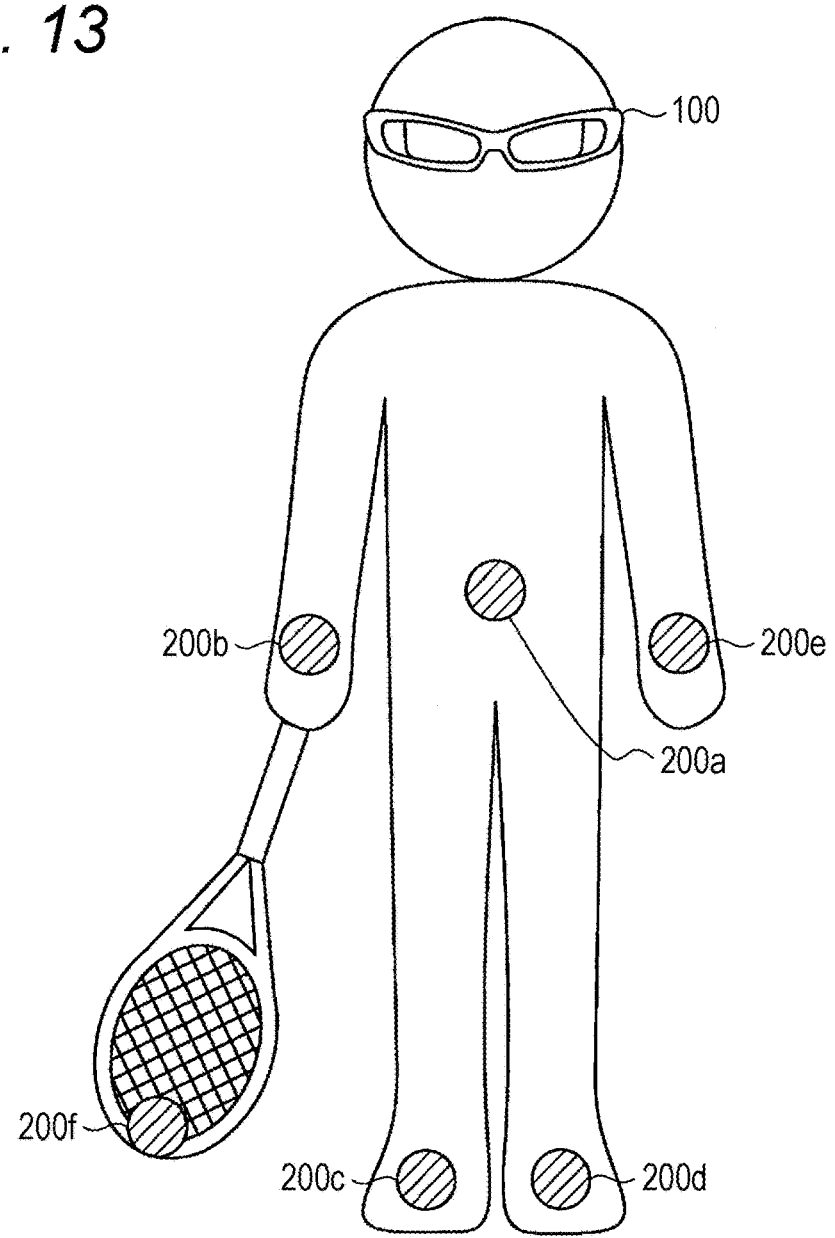
FIG. 13 is another diagram for explaining a variation of the first embodiment.

While the foregoing has described that the calculation unit 142 calculates the positional information of each attachment portion of the HMD 100 and the controller 200 by calculating the positional information using the inertial navigation and correcting the drift error generated at that time using the regression model, in a case where the precision of the IMU (IMU 110 and IMU 210) is improved, the drift error generated at the time of the position calculation based on the inertial navigation is made smaller so that the calculation unit 142 may not necessarily perform the correction using the regression model. In this case, even in a case where the controller 200 including the IMU 210 is attached to, instead of a part of the user's body, an object in contact with a part of the user's body, the calculation unit 142 can calculate positional information and attitude information of the object highly accurately by analyzing the first sensor information obtained by the IMU 210. For example, as illustrated in FIG. 13, with the controller 200f including the IMU 210 being attached to a tennis racket (real object) held by the user, the calculation unit 142 can calculate positional information and attitude information of the tennis racket highly accurately.

2. Second Embodiment

2.1. Overview

The first embodiment according to the present disclosure has been described above. Next, a second embodiment according to the present disclosure will be described.

In the first embodiment, the IMU 210 is used as a first sensor, and the image sensor 120 is used as a second sensor. Meanwhile, in the second embodiment, an IMU 210 is used as a first sensor, and a magnetic sensor is used as a second sensor. Here, compared to a process of calculating positional information and attitude information of an operator using the IMU 210 (first sensor), a process of calculating the positional information and the attitude information of the operator using the magnetic sensor (second sensor) consumes a larger amount of power although higher accuracy can be achieved.

In view of the above, an HMD 100 intermittently uses the magnetic sensor (second sensor) at the time of calculating the positional information and the attitude information of the operator. Accordingly, while the HMD 100 calculates the positional information and the attitude information using the IMU 210 (first sensor) and the like outside the set range, it can calculate the positional information and the attitude information highly accurately using the magnetic sensor (second sensor) in an important range (set range) of the content.

Figure 14:
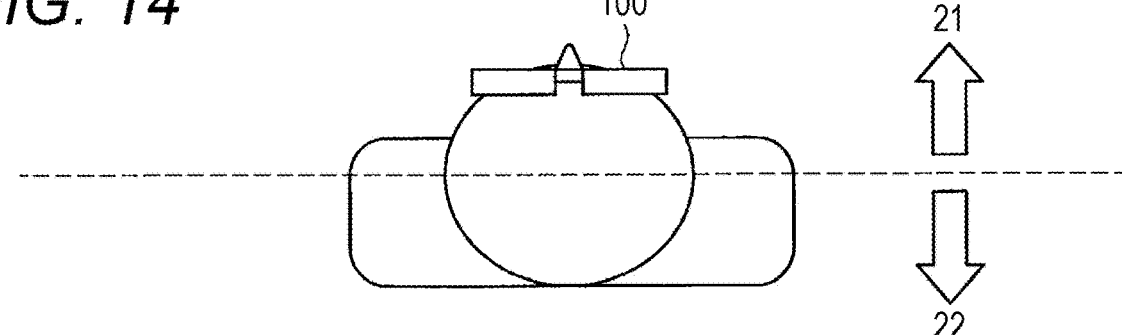
FIG. 14 is a diagram for explaining a specific example of a set range according to a second embodiment.

Here, depending on a magnetic tracking technique using a magnetic sensor, positional information and attitude information can be calculated in the entire circumference unlike a camera using an image sensor 120, whereby a predetermined area in the entire circumference of a user wearing the HMD 100 can be a set range. For example, as illustrated in FIG. 14, an area 21 on the front side of the frontal surface of the user and an area 22 on the rear side of the frontal surface can be the set range.

2.2. Exemplary Configuration

Figure 15:
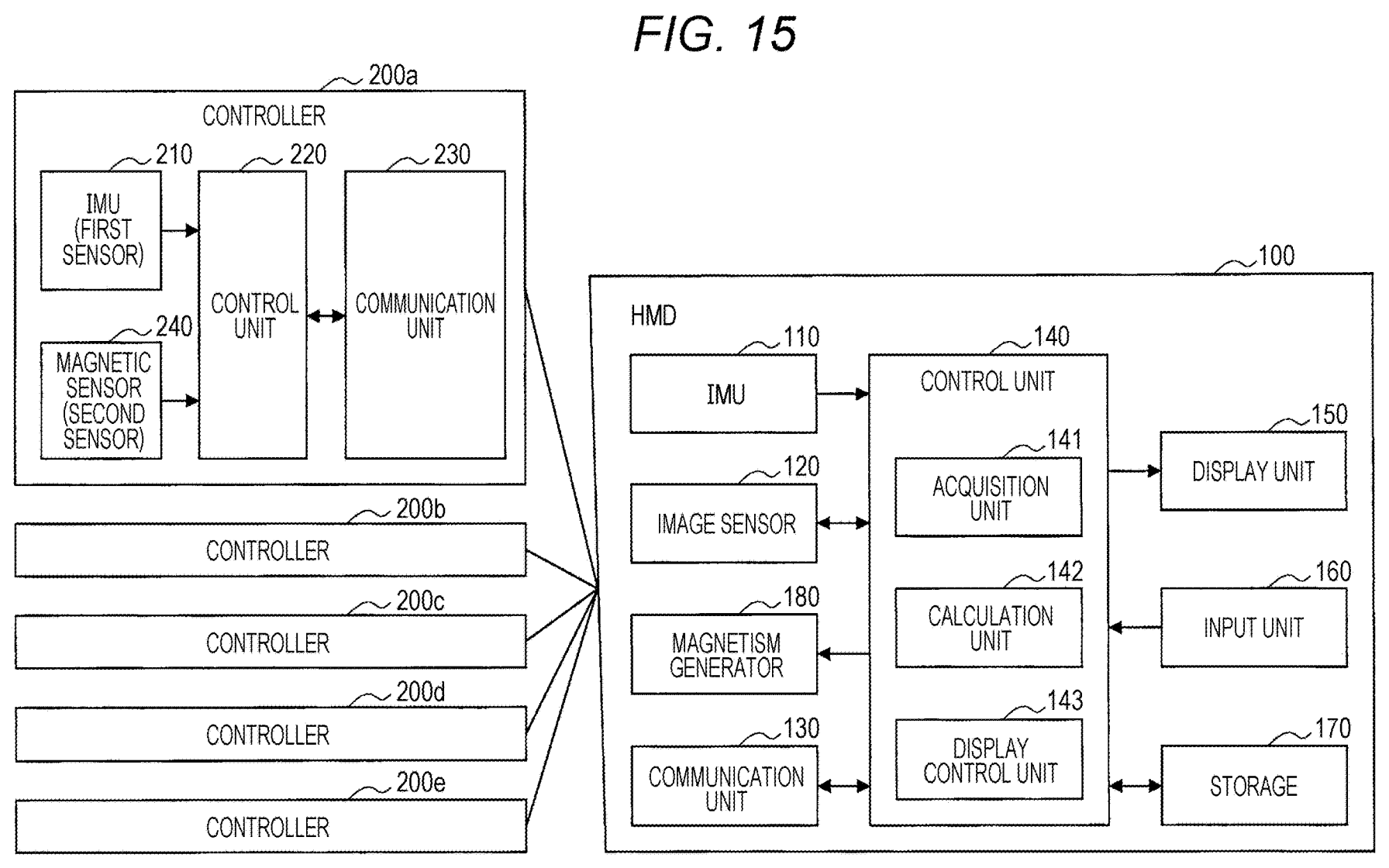

Next, an exemplary configuration of each device according to the second embodiment will be described with reference to FIG. 15. FIG. 15 is a block diagram illustrating an exemplary configuration of each device according to the second embodiment. Note that, hereinafter, descriptions of the contents similar to those of each configuration according to the first embodiment will be omitted, and different contents will be mainly described.

(2.2.1. Exemplary Configuration of Controller 200)

First, an exemplary configuration of a controller 200 according to the second embodiment will be described. As illustrated in FIG. 15, the controller 200 according to the second embodiment includes the IMU 210, a control unit 220, a communication unit 230, and a magnetic sensor 240.

The magnetic sensor 240 functions as a second sensor, and is configured to detect magnetism emitted from a magnetism generator 180 included in the HMD 100 to output magnetism detection information as second sensor information. The magnetic sensor 240 may be configured by, for example, a Hall element or the like, but is not necessarily limited thereto.

The control unit 220 controls communication performed by the communication unit 230, and causes the magnetism detection information (second sensor information) obtained by the magnetic sensor 240 to be transmitted to the HMD 100. Note that the configuration illustrated in FIG. 15 is merely an example, and the configuration of the controller 200 according to the second embodiment is not limited to such an example.

(2.2.2. Exemplary Configuration of HMD 100)

Next, an exemplary configuration of the HMD 100 according to the second embodiment will be described. As illustrated in FIG. 15, the HMD 100 according to the second embodiment includes an IMU 110, an image sensor 120, a communication unit 130, a control unit 140, a display unit 150, an input unit 160, a storage 170, and the magnetism generator 180. Furthermore, the control unit 140 includes an acquisition unit 141, a calculation unit 142, and a display control unit 143.

The magnetism generator 180 is configured to generate magnetism (magnetic field) to be detected by the magnetic sensor 240. The magnetism generator 180 may be configured by, for example, a magnetism generation coil or the like, but is not necessarily limited thereto.

In a similar manner to the first embodiment, the calculation unit 142 calculates skeleton information on the basis of first sensor information output by the IMU 210 (first sensor) of the controller 200 and sensor information output by the IMU 110 of its own device, and then intermittently uses the magnetism generator 180 and the magnetic sensor 240 (second sensor) on the basis of the positional information of the operator included in the skeleton information. More specifically, in a case where the positional information of the operator included in the skeleton information is included in the set range set in advance, the calculation unit 142 performs a publicly known magnetic tracking process using the magnetism detection information (second sensor information) output by the magnetic sensor 240, thereby calculating the positional information and the attitude information of the operator.

Furthermore, in the second embodiment as well, the calculation unit 142 performs a process related to the Visual SLAM using a captured image output by the image sensor 120, thereby calculating the positional information and the attitude information of the HMD 100.

Note that the configuration illustrated in FIG. 15 is merely an example, and the configuration of the HMD 100 according to the second embodiment is not limited to such an example. For example, the magnetism generator 180 may be included in the controller 200, and the magnetic sensor 240 may be included in the HMD 100.

2.3. Exemplary Process Flow

The foregoing has described the exemplary configuration of each device according to the second embodiment. Next, an exemplary process flow of each device according to the second embodiment will be described with reference to FIG. 16. FIG. 16 is a flowchart illustrating an exemplary process of providing a content to the user by the HMD 100 and the controller 200.

In step S1100, the acquisition unit 141 of the HMD 100 obtains the first sensor information obtained by the IMU 210 of the controller 200 (operator) and the sensor information obtained by the IMU 110. In step S1104, the calculation unit 142 calculates the positional information and the attitude information of the controller 200 (operator) on the basis of the first sensor information from the IMU 210 and the sensor information from the IMU 110.

In step S1108, the calculation unit 142 determines whether or not the controller 200 (operator) has entered the set range. In a case where the controller 200 (operator) is determined to have entered the set range (Yes in step S1108), in step S1112, the acquisition unit 141 obtains the magnetism detection information (second sensor information) obtained by the magnetic sensor 240.

In step S1116, the calculation unit 142 calculates the positional information and the attitude information of the controller 200 by analyzing the magnetism detection information (second sensor information). In step S1120, the calculation unit 142 corrects the positional information and the attitude information of the controller 200 calculated using the first sensor information on the basis of the calculation result.

In step S1124, the display control unit 143 controls the display unit 150 on the basis of the positional information and the attitude information of the controller 200, thereby superimpose and display the virtual object on the real world. In step S1128, the control unit 220 determines whether or not the content has ended. In a case where it is determined that the content has ended (Yes in step S1128), the series of processing ends, and in a case where it is determined that the content has not ended (No in step S1128), the process of steps S1100 to S1124 continues.

The second embodiment according to the present disclosure has been described above. It should be noted that the technical matters described in the first embodiment can be appropriately applied to the second embodiment.

3. Third Embodiment

3.1. Overview

The second embodiment according to the present disclosure has been described above. Next, a third embodiment according to the present disclosure will be described.

In the first embodiment, the IMU 210 is used as a first sensor and the image sensor 120 is used as a second sensor, and in the second embodiment, the IMU 210 is used as a first sensor and the magnetic sensor 240 is used as a second sensor. Meanwhile, in the third embodiment, a magnetic sensor 240 is used as a first sensor, and an image sensor 120 is used as a second sensor. Here, as described above, out of the first sensor and the second sensor according to the present disclosure, at least the first sensor is used as a pair with a predetermined instrument included in one device together with the second sensor. More specifically, in the third embodiment, the magnetic sensor 240 (first sensor) is used as a pair with a magnetism generator 180 (predetermined instrument) included in an HMD 100 (one device) together with the image sensor 120 (second sensor).

Compared to a process of calculating positional information and attitude information of an operator using the magnetic sensor 240 (first sensor), a process of calculating the positional information and the attitude information of the operator using the image sensor 120 (second sensor) consumes a larger amount of power although higher accuracy can be achieved. In view of the above, the HMD 100 intermittently uses the image sensor 120 (second sensor) at the time of calculating the positional information and the attitude information of the operator. Accordingly, while the HMD 100 calculates the positional information and the attitude information using the magnetic sensor 240 (first sensor) outside a set range, it can calculate the positional information and the attitude information highly accurately using the image sensor 120 (second sensor) in an important range (set range) of the content.

3.2. Exemplary Configuration

Next, an exemplary configuration of each device according to the third embodiment will be described with reference to FIG. 17. FIG. 17 is a block diagram illustrating an exemplary configuration of each device according to the third embodiment.

As illustrated in FIG. 17, a controller 200 according to the third embodiment includes a control unit 220, a communication unit 230, and a magnetic sensor 240. Note that those configurations have functions similar to those of the configurations according to the second embodiment described with reference to FIG. 15, and thus descriptions thereof will be omitted.

Furthermore, as illustrated in FIG. 17, the HMD 100 according to the third embodiment includes the image sensor 120, a communication unit 130, a control unit 140, a display unit 150, an input unit 160, a storage 170, and the magnetism generator 180. Furthermore, the control unit 140 includes an acquisition unit 141, a calculation unit 142, and a display control unit 143. Note that those configurations have functions similar to those of the configurations according to the second embodiment described with reference to FIG. 15, and thus descriptions thereof will be omitted.

3.3. Exemplary Process Flow

Figure 18:
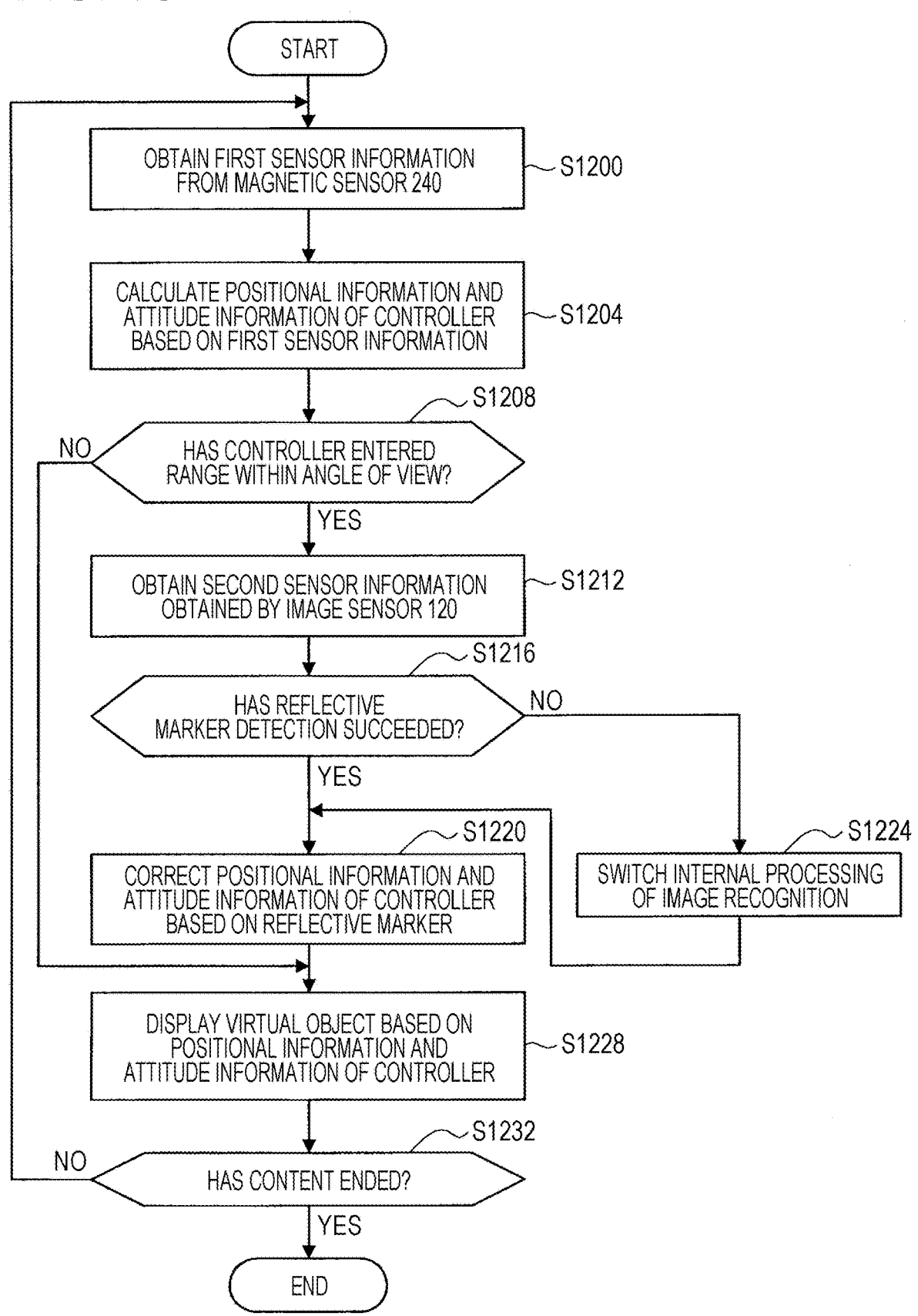
FIG. 18 is a flowchart illustrating an exemplary process of providing a content to a user by an HMD and a controller according to the third embodiment.

Next, an exemplary process flow of each device according to the third embodiment will be described with reference to FIG. 18. FIG. 18 is a flowchart illustrating an exemplary process of providing a content to a user by the HMD 100 and the controller 200. Note that, in the flowchart, a range within the angle of view of a camera is set as a set range in a similar manner to the first embodiment.

In step S1200, the acquisition unit 141 of the HMD 100 obtains magnetism detection information (first sensor information) obtained by the magnetic sensor 240 of the controller 200 (operator). In step S1204, the calculation unit 142 calculates positional information and attitude information of the controller 200 (operator) on the basis of the magnetism detection information (first sensor information).

In step S1208, the calculation unit 142 determines whether or not the controller 200 (operator) has entered the range (set range) within the angle of view of the camera. In a case where the controller 200 (operator) is determined to have entered the range (set range) within the angle of view of the camera (Yes in step S1208), in step S1212, the acquisition unit 141 obtains the captured image (second sensor information) obtained by the image sensor 120.

In step S1216, the calculation unit 142 attempts to detect a reflective marker included in the controller 200 by analyzing the captured image (second sensor information). In a case where the reflective marker included in the controller 200 is detected (Yes in step S1216), in step S1220, the calculation unit 142 corrects the positional information and the attitude information of the controller 200 calculated using the magnetism detection information (first sensor information) on the basis of the detected reflective marker (i.e., controller 200 including the reflective marker).

In a case where the reflective marker included in the controller 200 is not detected despite the fact that the controller 200 is determined to have entered the range (set range) within the angle of view of the camera (No in step S1216), in step S1224, it is determined that the imaging condition and the recognition performance are the cause of the failure in the reflective marker detection, and the calculation unit 142 attempts to detect the reflective marker by switching internal processing of the image recognition. A specific example of the internal processing switching may be similar to that described with reference to FIG. 9, and thus descriptions thereof will be omitted. In a case where the detection of the reflective marker has succeeded by switching the internal processing of the image recognition, the calculation unit 142 corrects the positional information and the attitude information of the controller 200 on the basis of the reflective marker in step S1220.

In step S1228, the display control unit 143 controls the display unit 150 on the basis of the positional information and the attitude information of the controller 200, thereby superimpose and display the virtual object on the real world. In step S1232, the control unit 220 determines whether or not the content has ended. In a case where it is determined that the content has ended (Yes in step S1232), the series of processing ends, and in a case where it is determined that the content has not ended (No in step S1232), the process of steps S1200 to S1228 continues.

The third embodiment according to the present disclosure has been described above. It should be noted that the technical matters described in the first embodiment and the second embodiment can be appropriately applied to the third embodiment.

4. Specific Example of Positional Information Calculation Method

The third embodiment according to the present disclosure has been described above. Next, a specific example of a method of calculating positional information of each attachment portion of the HMD 100 and the controller 200 based on the first sensor information output by the IMU 210 of the controller 200 and the sensor information output by the IMU 110 of the HMD 100 will be described.

As described above, the HMD 100 calculates positional information by inertial navigation, and corrects a drift error generated at that time by a regression model, for example, whereby the positional information of each attachment portion of the HMD 100 and the controller 200 can be calculated with higher accuracy.

Figure 19:
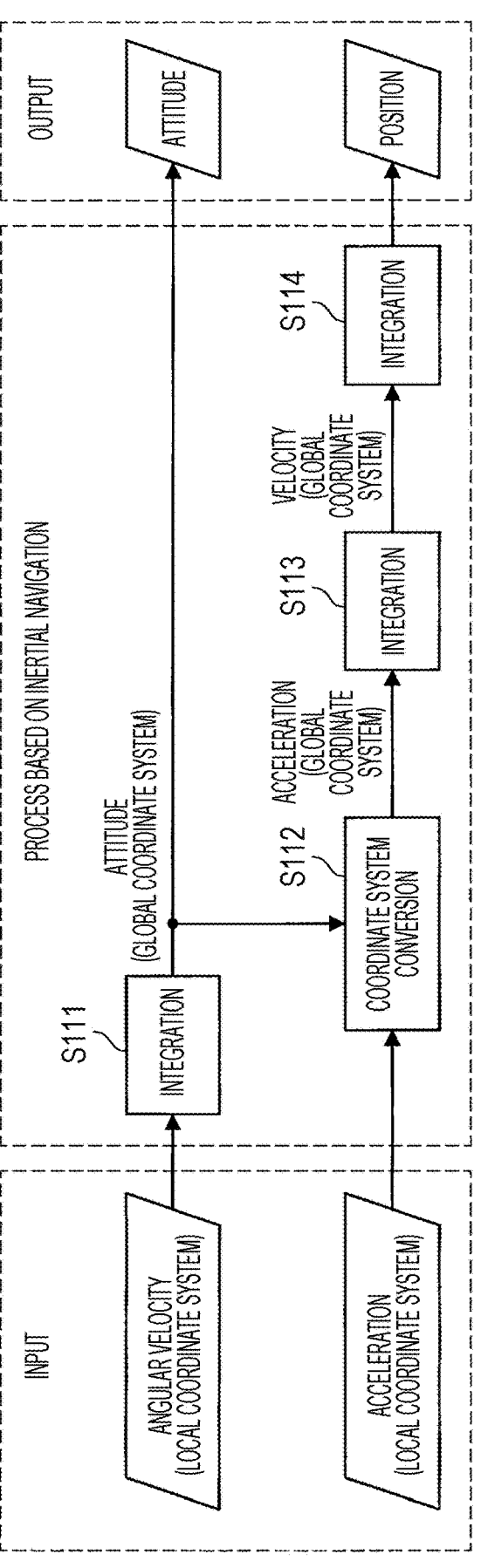
FIG. 19 is a schematic diagram illustrating an outline of a position estimating process based on inertial navigation.

First, as a premise, a position calculation process based on inertial navigation will be described. The inertial navigation is a technique for calculating sensor positional information by integrating an angular velocity and acceleration multiple times, and is adopted in, for example, ships, aircraft, or the like. FIG. 19 is a schematic diagram illustrating an outline of the position calculation process based on the inertial navigation.

According to the inertial navigation, first, the angular velocity in the local coordinate system (coordinate system set for each sensor device) obtained by a gyroscope sensor is integrated (S111), thereby calculating an attitude of the controller 200 and the HMD 100 in the global coordinate system. Next, on the basis of the attitude of each device in the global coordinate system, the acceleration of the sensor device in the local coordinate system obtained by the acceleration sensor included in each device is converted into acceleration of each device in the global coordinate system (S112). Then, the acceleration in the global coordinate system, which has been subject to coordinate system conversion, is integrated (S113), thereby calculating a velocity of each device in the global coordinate system. Next, the velocity of each device in the global coordinate system is integrated (S114), thereby calculating a moving distance of each device. Here, the moving distance in the global coordinate system is synthesized for each subdivision point, whereby relative positional information starting from the initial position can be obtained. When the initial position is known, absolute positional information of each device (i.e., three-dimensional coordinates in the global coordinate system) can be calculated using the information described above. As described above, according to the position calculation process based on the inertial navigation, the attitude information and the positional information of each device are output.

The position calculation process based on the inertial navigation illustrated in FIG. 19 can be executed at high speed with a relatively small processing load.

Here, in the inertial navigation, the integration applied to the angular velocity to obtain attitude information is only once in step S111, and the attitude information can be obtained highly accurately by combining well-known techniques such as an attitude and heading reference system (AHRS). On the other hand, the integration is applied to the acceleration twice in steps S113 and S114 to obtain positional information, whereby errors are accumulated in the output positional information in a case where an error is contained in the acceleration obtained by the acceleration sensor.

Figure 20:
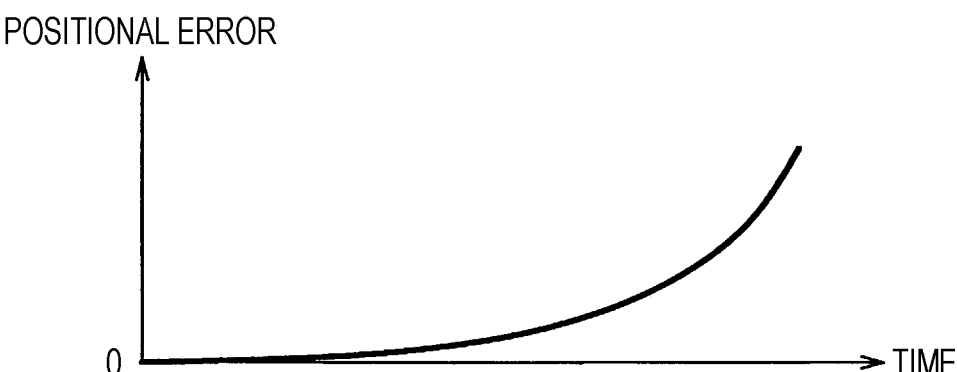
FIG. 20 is a schematic diagram illustrating a time variation image of a positional error that may be generated in the position estimating process based on inertial navigation.

FIG. 20 is a schematic diagram illustrating a time variation image of a positional error that may be generated in the position calculation process based on the inertial navigation. As illustrated in FIG. 20, the positional error is small and the positional information can be calculated highly accurately during a short period of time from the start of the positional information calculation based on the inertial navigation. However, errors contained in the positional information calculated by the inertial navigation may increase with time as illustrated in FIG. 20, whereby a significantly large error may be contained in the positional information in a case where the calculation is continuously executed for a long time.

Figure 21:
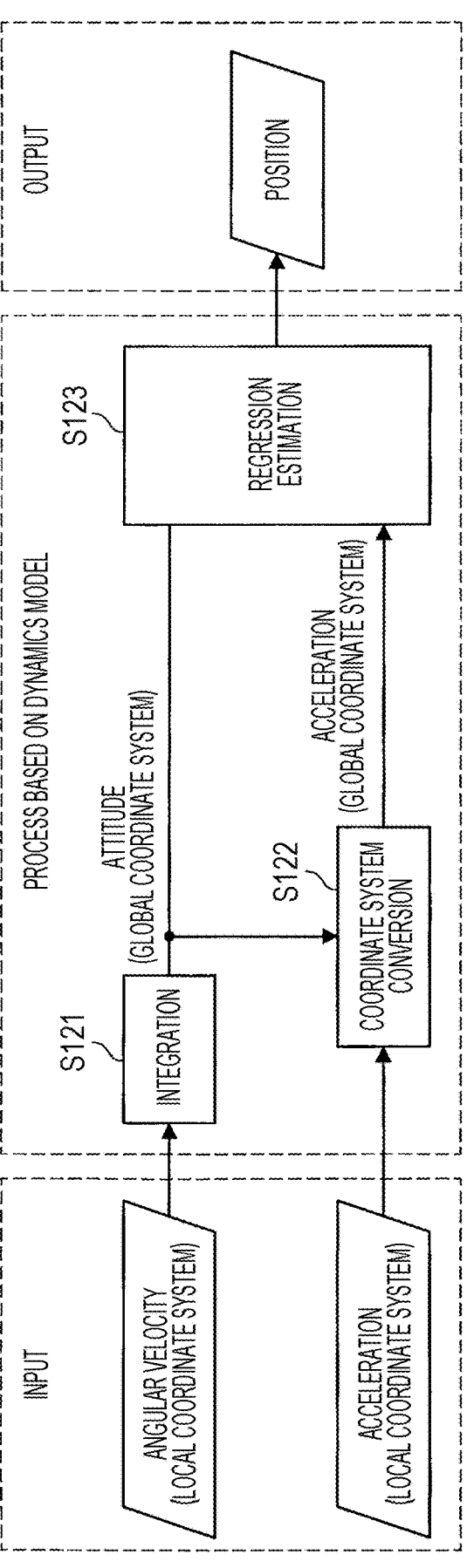
FIG. 21 is a schematic diagram illustrating an outline of a position estimating process based on a dynamics model.

In view of the above, in the present embodiment, calculation of a position of an attachment part by regression is performed on the basis of a dynamics model. FIG. 21 is a schematic diagram illustrating an outline of a position calculation process based on the dynamics model.

The process of steps S121 to S122 illustrated in FIG. 21 is similar to the process of steps S111 to S112 described with reference to FIG. 19, and thus descriptions thereof will be omitted here. As illustrated in FIG. 21, in the position calculation process based on the dynamics model, positional information of each device is estimated by regression without integrating acceleration (S123). In the regression estimation process of step S123, positional information is estimated by the regression that applies the attitude and the acceleration of each device in the global coordinate system to the dynamics model prepared in advance. Here, the dynamics model can be generated by, for example, learning motion constraint information (e.g., information including a plurality of position and attitude samples of each part in a pose or a series of motions obtained in the past) in advance. Note that various regression analysis methods can be used for the regression estimation process of step S123, and for example, methods such as a deep neural network (DNN), Random Forest, and the like may be used alone or in combination.

Figure 22:
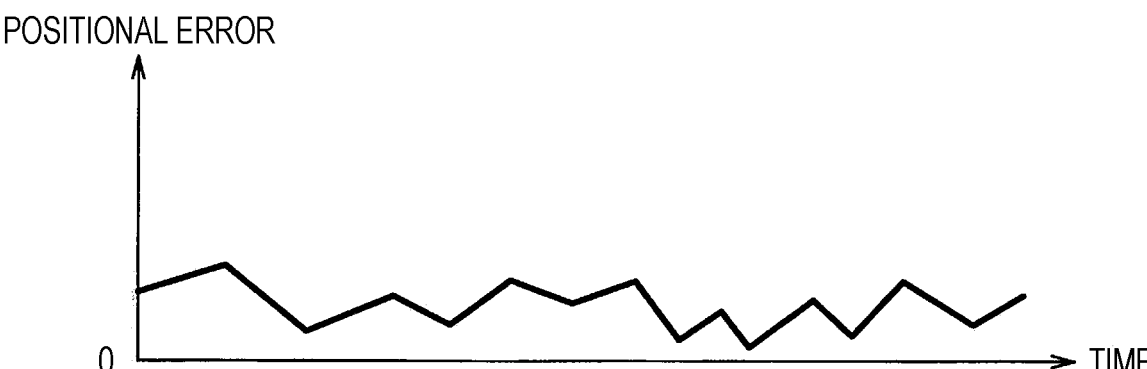
FIG. 22 is a schematic diagram illustrating a time variation image of a positional error that may be generated in the position estimating process based on the dynamics model.

Here, in the process illustrated in FIG. 21, the acceleration is not integrated, whereby a positional error is unlikely to increase with time unlike the case of the inertial navigation described with reference to FIGS. 19 and 20. FIG. 22 is a schematic diagram illustrating a time variation image of a positional error that may be generated in the position calculation process based on the dynamics model. As illustrated in FIG. 22, although a positional error is generated in the position calculation process based on the dynamics model as well, it does not increase with time, whereby a large error is unlikely to be generated even in a case where the calculation is continuously executed for a long time.

Therefore, it is considered that the positional information can be calculated highly accurately by the position calculation process based on the dynamics model illustrated in FIG. 21. However, statistical calculation by regression is performed in the position calculation process based on the dynamics model, whereby a change in output (calculation result) tends to be discontinuous even in a case where a change in input is continuous. As a result, there is a possibility that a sense of discomfort is likely to be given when the ultimately obtained skeleton information is visualized, for example. Furthermore, the position calculation process based on the dynamics model illustrated in FIG. 21 has a processing load larger than that of the position calculation process based on the inertial navigation illustrated in FIG. 19, and is difficult to execute at a speed higher than that of the position calculation process based on the inertial navigation.

As described above, the position calculation process based on the inertial navigation and the position calculation process based on the dynamics model have their respective characteristics. In view of the above, in the present embodiment, both of the position calculation process based on the inertial navigation and the position calculation process based on the dynamics model are combined and the calculated positional information is corrected, thereby calculating the positional information with higher accuracy. Note that, hereinafter, the position calculation process based on the inertial navigation may be referred to as a first process, and the position calculation process based on the dynamics model may be referred to as a second process.

Figure 23:
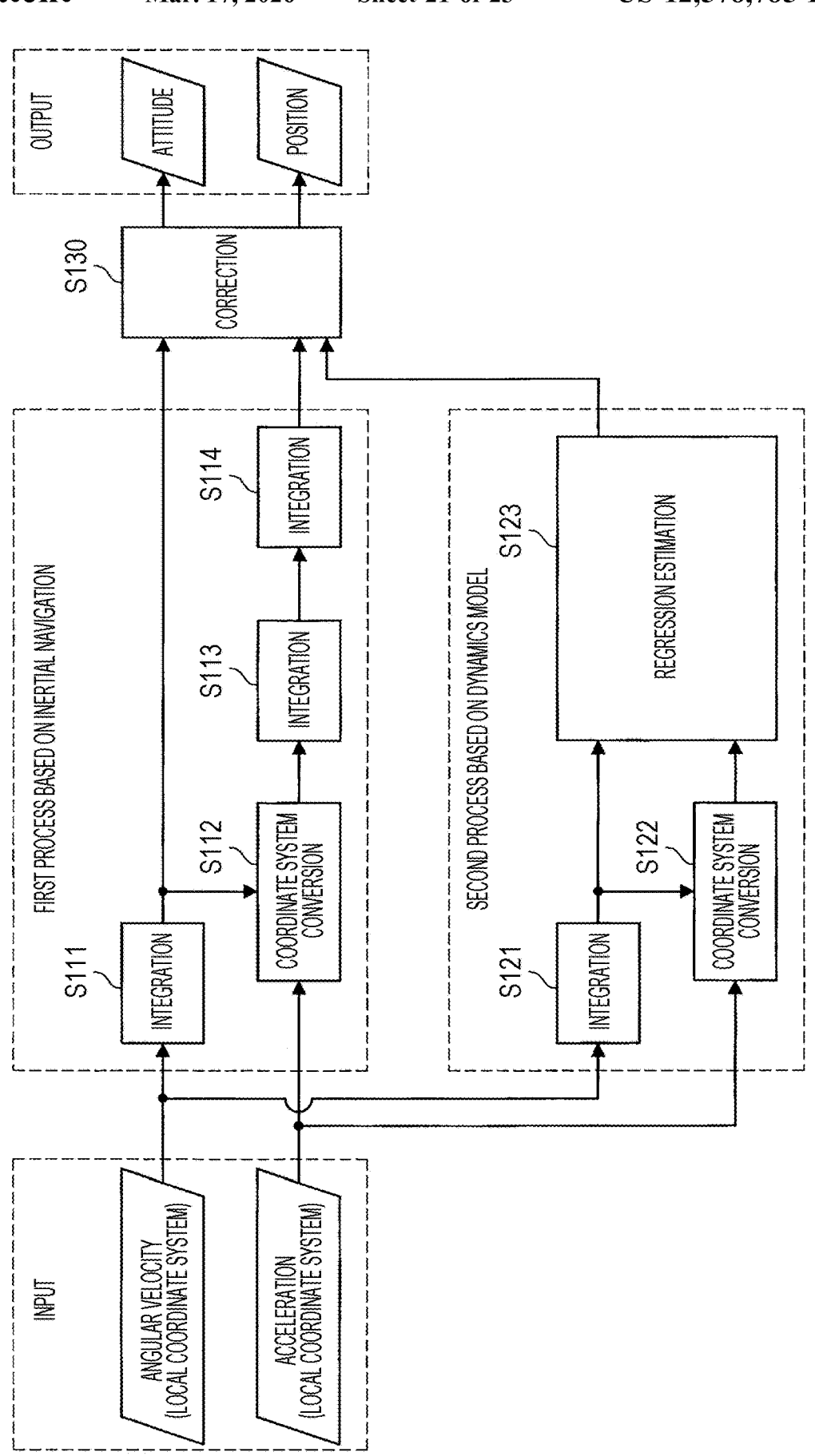
FIG. 23 is a schematic diagram illustrating an outline of position estimating processes according to the same embodiment.

FIG. 23 is a schematic diagram illustrating an outline of the position calculation process by the calculation unit 142 of the HMD 100 according to the present disclosure. Note that FIG. 23 illustrates an outline, and the position calculation process by the calculation unit 142 may include processing not illustrated in FIG. 23.

As illustrated in FIG. 23, the position calculation process by the calculation unit 142 includes correction processing (S130) in addition to the first process (S111 to S114) based on the inertial navigation and the second process (S121 to S123) based on the dynamics model. In the correction processing of step S130, correction is performed with reference to the output of the first process (hereinafter also referred to as first output) and the output of the second process (hereinafter also referred to as second output). Note that the first output includes attitude information and positional information of an attachment portion, and the second output includes positional information. Then, in step S130, the positional information included in the first output is corrected on the basis of the attitude information included in the first output and the positional information included in the second output. Note that, in step S130, the attitude information included in the first output may be output as it is in addition to being used to correct the positional information. Furthermore, the correction processing of step S130 may be achieved by a Kalman filter, for example.

Furthermore, as described above, the first process may be executed at a speed higher than that of the second process. Therefore, the correction processing (S130) is executed at a timing when the second output is obtained, and in a case where only the first output is obtained while no second output is obtained, the first output may be output as it is as the output of the position calculation process according to the present embodiment.

Figure 24:
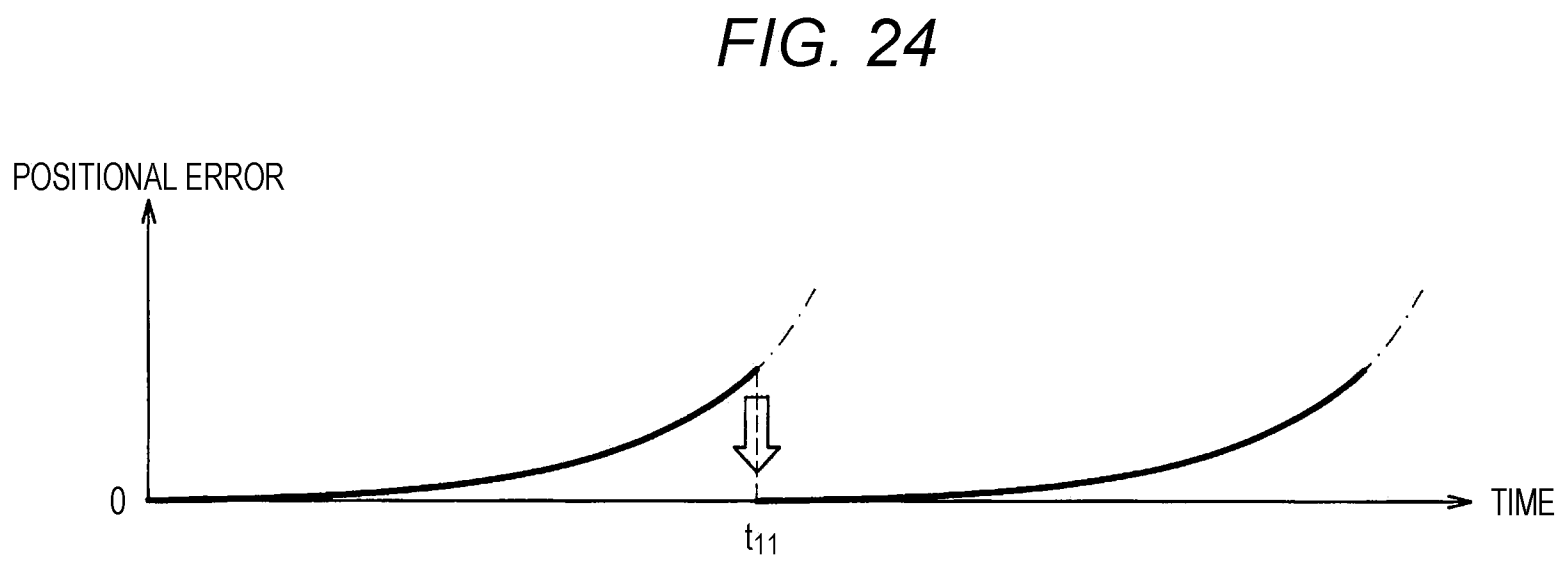

FIG. 24 is a schematic diagram illustrating a time variation image of a positional error that may be generated in the position calculation process according to the present embodiment. In the example illustrated in FIG. 24, it is assumed that the second output is obtained at time t11 and the correction based on the second output is performed. As illustrated in FIG. 24, in the position calculation process according to the present embodiment, while a positional error increases with time during the period from the start of the process to the time t11, the correction based on the second output is performed at the time t11, whereby the positional error is suppressed.

As described above, according to the position calculation process by the calculation unit 142, the positional error is suppressed each time the correction is performed, whereby the error is unlikely to increase with time and a large error is unlikely to be generated even in a case where the calculation is continuously executed for a long time. Furthermore, according to the position calculation process by the calculation unit 142, the first output is output as it is in a case where no second output is obtained, whereby positional information can be calculated with high frequency as compared with the case of performing the position calculation only by the second process based on the dynamics model.

As described above, the HMD 100 can achieve highly accurate calculation of positional information and attitude information with a smaller number of the controllers 200 by correcting the drift error generated at the time of the position calculation based on the inertial navigation using the regression model. Note that the position calculation process by the calculation unit 142 is not limited to the method (method using the inertial navigation and the regression model) described above. Furthermore, in a case where the precision of the IMU (IMU 110 and IMU 210) is improved, the drift error generated at the time of the position calculation based on the inertial navigation is made smaller so that the correction using the regression model may not necessarily be performed.

5. Exemplary Hardware Configuration

Figure 25:
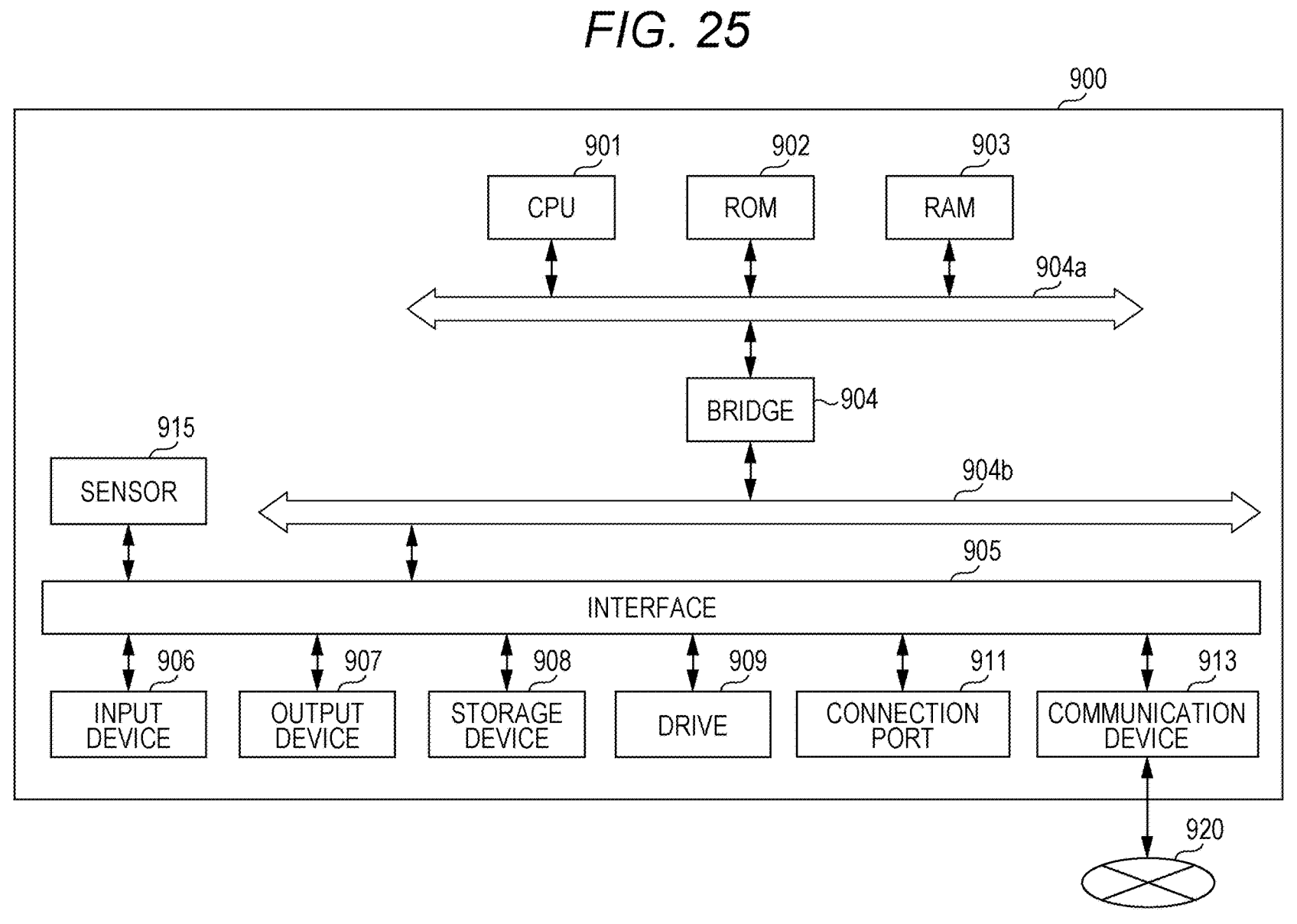

A specific example of the method of calculating positional information of each attachment portion of the HMD 100 and the controller 200 has been described above. Finally, with reference to FIG. 25, an exemplary hardware configuration of the HMD 100 or the controller 200 according to each of the embodiments described above will be described. FIG. 25 is a block diagram illustrating an exemplary hardware configuration of an information processing apparatus that embodies the HMD 100 or the controller 200 in each embodiment. Information processing by the HMD 100 or the controller 200 according to each embodiment is achieved by cooperation between software and hardware to be described below.

As illustrated in FIG. 25, an information processing apparatus 900 includes a central processing unit (CPU) 901, a read only memory (ROM) 902, a random access memory (RAM) 903, and a host bus 904a. Furthermore, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit, such as a digital signal processor (DSP) and an application specific integrated circuit (ASIC), in place of or in combination with the CPU 901.

The CPU 901 functions as an arithmetic processing device and a control device, and controls overall operation in the information processing apparatus 900 according to various programs. Furthermore, the CPU 901 may be a microprocessor. The ROM 902 stores programs, operation parameters, and the like to be used by the CPU 901. The RAM 903 temporarily stores programs to be used in the execution of the CPU 901, parameters that appropriately change in the execution, and the like. The CPU 901 may embody, for example, the control unit 140 or the control unit 220.

The CPU 901, the ROM 902, and the RAM 903 are connected to each other by the host bus 904a including a CPU bus and the like. The host bus 904a is connected to the external bus 904b, such as a peripheral component interconnect/interface (PCI) bus, via the bridge 904. Note that the host bus 904a, the bridge 904, and the external bus 904b are not necessary configured separately, and those functions may be implemented on one bus.

The input device 906 is constructed by, for example, a device to which information is input by the user, such as a mouse, a keyboard, a touch panel, a button, a microphone, a switch, and a lever. Furthermore, the input device 906 may be, for example, a remote control device using infrared rays or other radio waves, or may be external connection equipment such as a mobile phone supporting operation of the information processing apparatus 900 and a personal digital assistant (PDA). Moreover, the input device 906 may include, for example, an input control circuit or the like that generates input signals on the basis of information input by the user using the input means mentioned above and outputs the signals to the CPU 901. The user of the information processing apparatus 900 operates the input device 906 to input various data or to provide an instruction for processing operation to the information processing apparatus 900. The input device 906 may embody, for example, the input unit 160.

The output device 907 is formed by a device capable of visually or aurally notifying the user of the obtained information. Examples of such a device include a display device such as a cathode-ray tube (CRT) display device, a liquid crystal display device, a plasma display device, an electroluminescent (EL) display device, and a lamp, an audio output device such as a speaker and a headphone, a printer device, and the like. The output device 907 outputs, for example, a result obtained by various kinds of processing performed by the information processing apparatus 900. Specifically, the display device visually displays the result obtained by various kinds of processing performed by the information processing apparatus 900 in various forms such as text, an image, a table, and a graph. Meanwhile, the audio output device converts audio signals including reproduced voice data, acoustic data, and the like into analog signals and aurally outputs the analog signals. The output device 907 may embody, for example, the display unit 150.

The storage device 908 is a device for storing data, which is formed as an example of storage of the information processing apparatus 900. The storage device 908 is constructed by, for example, a magnetic storage device such as a hard disk drive (HDD), a semiconductor storage device, an optical storage device, a magneto-optical storage device, and the like. The storage device 1908 may include a storage medium, a recording device that records data on the storage medium, a reading device that reads data from the storage medium, a deleting device that deletes data recorded on the storage medium, and the like. The storage device 908 stores programs to be executed by the CPU 901, various data, various data obtained from the outside, and the like. The storage device 908 may embody, for example, the storage 170.

The drive 909 is a reader/writer for a storage medium, and is built in or externally attached to the information processing apparatus 900. The drive 909 reads information recorded in a placed removable storage medium such as a magnetic disk, an optical disk, a magneto optical disk, a semiconductor memory, or the like, and outputs the information to the RAM 903. Furthermore, the drive 909 can also write information to the removable storage medium.

The connection port 911 is an interface to be connected to an external device, and is a connection port for an external device capable of transmitting data using a universal serial bus (USB) or the like, for example.

The communication device 913 is, for example, a communication interface formed by a communication device or the like for connecting to a network 920. The communication device 913 is, for example, a communication card for a wired or wireless local area network (LAN), long term evolution (LTE), Bluetooth (registered trademark), wireless USB (WUSB), and the like. Furthermore, the communication device 913 may be a router for optical communication, a router for an asymmetric digital subscriber line (ADSL), a modem for various kinds of communication, or the like. For example, the communication device 913 is capable of transmitting and receiving signals and the like using, for example, a predetermined protocol such as TCP/IP with the Internet and other communication equipment. The communication device 913 may embody, for example, the communication unit 130 or the communication unit 230.

The sensor 915 is, for example, various sensors such as an acceleration sensor, a gyroscope sensor, a geomagnetic sensor, a light sensor, a sound sensor, a distance measuring sensor, a force sensor, or the like. The sensor 915 obtains information associated with a state of the information processing apparatus 900 itself, such as an attitude, a moving speed, and the like of the information processing apparatus 900, and information associated with a surrounding environment of the information processing apparatus 900, such as brightness, noise, and the like around the information processing apparatus 900. Furthermore, the sensor 915 may include a global positioning system (GPS) sensor that receives GPS signals to measure the latitude, longitude, and altitude of the device. The sensor 915 may embody, for example, the IMU 110, the IMU 210, the image sensor 120, the magnetism generator 180, or the magnetic sensor 240.

Note that the network 920 is a wired or wireless transmission path for information transmitted from a device connected to the network 920. For example, the network 920 may include a public network such as the Internet, a telephone network, and a satellite communication network, various local area networks (LANs) including Ethernet (registered trademark), a wide area network (WAN), and the like. Furthermore, the network 920 may include a dedicated network such as an internet protocol-virtual private network (IP-VPN).

The exemplary hardware configuration that can implement the functions of the information processing apparatus 900 according to each embodiment of the present disclosure has been described above. Each component described above may be configured using a general-purpose member, or may be configured by hardware specialized for the function of each component. Therefore, it is possible to appropriately change the hardware configuration to be used depending on the technical level of the time of carrying out the embodiments according to the present disclosure.

Note that it is possible to create a computer program for implementing each function of the information processing apparatus 900 according to each embodiment of the present disclosure described above, and to install the program on a PC or the like. Furthermore, it is also possible to provide a computer-readable recording medium storing such a computer program. The recording medium is, for example, a magnetic disk, an optical disk, a magneto optical disk, a flash memory, or the like. Furthermore, the computer program described above may be distributed via a network, for example, without using a recording medium.

6. Summary

As described above, the information processing system according to the present disclosure includes a first sensor that outputs first sensor information to be used to calculate positional information of an operator, and a second sensor that outputs second positional information requiring a large amount of power for calculation thereof while it is capable of calculating the positional information with accuracy higher than that of the first sensor information. In addition, in a case where the positional information of the operator calculated using the first sensor information is included in a set range set in advance, the HMD 100 according to the present disclosure calculates the positional information of the operator using the second sensor information. With this arrangement, while the HMD 100 calculates the positional information and the attitude information using the first sensor outside the set range, it can calculate the positional information and the attitude information with higher accuracy using the second sensor in an important range (set range) of the content. Furthermore, the HMD 100 can reduce the power consumption by intermittently using the second sensor in this manner.

There have been described a case where the IMU 210 is used as a first sensor and the image sensor 120 is used as a second sensor in the first embodiment according to the present disclosure, a case where the IMU 210 is used as a first sensor and a magnetic sensor 240 is used as a second sensor in the second embodiment, and a case where the magnetic sensor 240 is used as a first sensor and the image sensor 120 is used as a second sensor in the third embodiment. However, it should be noted that the types and combinations of the sensors used as the first sensor and the second sensor are not limited thereto.

Although the preferred embodiments of the present disclosure have been described in detail with reference to the accompanying drawings, the technical scope of the present disclosure is not limited to such examples. It is obvious that those skilled in the art in the technical field of the present disclosure may find various alterations and modifications within the technical ideas of the appended claims, and it should be understood that such alterations and modifications are also naturally within the technical scope of the present disclosure.

For example, each step in each flowchart described above does not necessarily have to be processed in a time series in the described order. In other words, each step in each flowchart may be processed in an order different from the described order, or may be processed in parallel.

Furthermore, the effects described in the present specification are merely illustrative or exemplary, and are not limited. That is, the technology according to the present disclosure can exert other effects obvious to those skilled in the art from the disclosure of the present specification together with or instead of the effects described above.

Note that the following configurations are also within the technical scope of the present disclosure.

(1)
An information processing apparatus including:
an acquisition unit that obtains first sensor information, which is output by a first sensor and is to be used to calculate positional information of an operator, and second sensor information, which is output by a second sensor and is to be used to calculate the positional information of the operator; and
a calculation unit that calculates the positional information of the operator using the second sensor information in a case where the positional information of the operator calculated using the first sensor information is included in a set range set in advance.

(2)
The information processing apparatus according to (1) described above, in which
the positional information calculated using the first sensor information is defined by a coordinate system of the positional information calculated using the second sensor information.

(3)
The information processing apparatus according to (1) or (2) described above, in which
the calculation unit calculates the positional information of the operator using the first sensor information and the second sensor information in a case where:

28 the positional information of the operator calculated using the first sensor information is included in the set range.

(4)
The information processing apparatus according to (3) described above, in which
the acquisition of the second sensor information starts in response to the positional information calculated using the first sensor information having entered the set range, and
the acquisition of the second sensor information stops in response to the positional information calculated using the first sensor information having got out of the set range.

(5)
The information processing apparatus according to (3) described above, in which
a period during which the second sensor information is obtained by the positional information calculation process using the second sensor information is shorter than a period during which the first sensor information is obtained by the positional information calculation process using the first sensor information.

(6)
The information processing apparatus according to (5) described above, in which
an acquisition frequency of the second sensor information increases in response to the positional information calculated using the first sensor information having entered the set range, and
the acquisition frequency of the second sensor information decreases in response to the positional information calculated using the first sensor information having got out of the set range.

(7)
The information processing apparatus according to any one of (1) to (6) described above, in which
the process of calculating the positional information of the operator using the second sensor information consumes a larger amount of power compared with the process of calculating the positional information of the operator using the first sensor information.

(8)
The information processing apparatus according to any one of (1) to (7) described above, in which
at least the first sensor out of the first sensor and the second sensor is used as a pair with a predetermined instrument included in one device together with the second sensor.

(9)
The information processing apparatus according to (7) or (8) described above, in which
the first sensor is an IMU and the second sensor is an image sensor, the first sensor is an IMU and the second sensor is a magnetic sensor, or the first sensor is a magnetic sensor and the second sensor is an image sensor.

(10)
The information processing apparatus according to (9) described above, in which
the first sensor and the second sensor are attached to a part of a user's body or an object in contact with the part.

(11)
The information processing apparatus according to (10) described above, in which
the operator is an attachment portion of the first sensor or the second sensor or a portion other than the attachment portion on the user's body or on the object.

(12)

The information processing apparatus according to (10) or (11) described above, in which the set range corresponds to a field of view of the user.

(13)

The information processing apparatus according to (12) described above, in which a display unit displays a virtual object in the field of view of the user, the information processing apparatus further including a display control unit that controls display of the virtual object by the display unit on the basis of the positional information of the operator.

(14)

The information processing apparatus according to (13) described above, in which the display control unit superimposes and displays the virtual object on the operator by controlling the display unit on the basis of the positional information of the operator.

(15)

A method for processing information to be executed by a computer, the method including:

obtaining first sensor information, which is output by a first sensor and is to be used to calculate positional information of an operator, and second sensor information, which is output by a second sensor and is to be used to calculate the positional information of the operator; and calculating the positional information of the operator using the second sensor information in a case where the positional information of the operator calculated using the first sensor information is included in a set range set in advance.

(16)

A program for causing a computer to perform:

obtaining first sensor information, which is output by a first sensor and is to be used to calculate positional information of an operator, and second sensor information, which is output by a second sensor and is to be used to calculate the positional information of the operator; and calculating the positional information of the operator using the second sensor information in a case where the positional information of the operator calculated using the first sensor information is included in a set range set in advance.

REFERENCE SIGNS LIST

100 HMD
110 IMU
120 Image sensor
130 Communication unit
140 Control unit
141 Acquisition unit
142 Calculation unit
143 Display control unit
150 Display unit
160 Input unit
170 Storage
180 Magnetism generator
200 Controller
210 IMU
220 Control unit
230 Communication unit
240 Magnetic sensor

The invention claimed is:

1. An information processing system comprising:

at least one controller; and a head mounted display;

wherein the head mounted display comprises circuitry configured to receive first sensor information from an inertial measurement unit (IMU) of the at least one controller, receive second sensor information from an image sensor of the head mounted display, and detect a position and an attitude of the at least one controller based on at least one of the first sensor information or the second sensor information, wherein the second sensor information is used when the position of the at least one controller is included in an angle of view of the image sensor, wherein the second sensor information is not used when the position of the at least one controller is not included in the angle of view of the image sensor, and wherein a predetermined range in which the second sensor information is used is determined according to a degree of importance of each area of space with respect to content included in an image captured by the image sensor.

2. The information processing system according to claim 1, wherein a predetermined range in which the second sensor information is used is a range narrower than the angle of view of the image sensor of the head mounted display.

3. The information processing system according to claim 1, wherein the head mounted display and the at least one controller are spatially separated.

4. The information processing system according to claim 1, wherein the head mounted display includes a video see-through head-mounted display.

5. The information processing system according to claim 1, wherein the at least one controller is configured to be attached to a part of a body of a user.

6. The information processing system according to claim 5, wherein the part of the body of the user includes at least one of a wrist, an ankle, a head, or a waist of the user.

7. The information processing system according to claim 1, wherein a number of the at least one controller is 6 or 12.

8. The information processing system according to claim 1, wherein the circuitry is further configured to control a display to display a virtual object superimposed on an image of a real space captured by the image sensor.

9. A method for processing information to be executed by a computer, the method comprising:

receiving first sensor information from an inertial measurement unit (IMU) of at least one controller;

receiving second sensor information from an image sensor of a head mounted display; and detecting a position and an attitude of the at least one controller based on at least one of the first sensor information or the second sensor information, wherein the second sensor information is used when the position of the at least one controller is included in an angle of view of the image sensor, wherein the second sensor information is not used when the position of the at least one controller is not included in the angle of view of the image sensor, and wherein a predetermined range in which the second sensor information is used is determined according to a degree of importance of each area of space with respect to content included in an image captured by the image sensor.

10. The method according to claim 9, wherein a predetermined range in which the second sensor information is used is a range narrower than the angle of view of the image sensor of the head mounted display.

11. The method according to claim 9, wherein the head mounted display and the at least one controller are spatially separated.

12. The method according to claim 9, wherein the head mounted display includes a video see-through head-mounted display.

13. The method according to claim 9, wherein the at least one controller is configured to be attached to a part of a body of a user.

14. The method according to claim 13, wherein the part of the body of the user includes at least one of a wrist, an ankle, a head, or a waist of the user.

15. The method according to claim 9, wherein a number of the at least one controller is 6 or 12.

16. The method according to claim 9, further comprising:

displaying a virtual object superimposed on an image of a real space captured by the image sensor.

17. A non-transitory computer-readable storage medium having embodied thereon a program, which when executed by a computer causes the computer to execute a method, the method comprising:

receiving first sensor information from an inertial measurement unit (IMU) of at least one controller;

receiving second sensor information from an image sensor of a head mounted display; and detecting a position and an attitude of the at least one controller based on the first sensor information and the second sensor information, wherein the second sensor information is used when the position of the at least one controller is included in an angle of view of the image sensor, wherein the second sensor information is not used when the position of the at least one controller is not included in the angle of view of the image sensor, and wherein a predetermined range in which the second sensor information is used is determined according to a degree of importance of each area of space with respect to content included in an image captured by the image sensor.

* * * * *